United States Patent
Sakoda et al.

(10) Patent No.: US 10,034,223 B2
(45) Date of Patent: Jul. 24, 2018

(54) GENERATION AND MANAGEMENT OF COMMUNICATION PATHS BETWEEN INFORMATION PROCESSING DEVICES

(71) Applicant: SONY CORPORATION, Tokyo (JP)

(72) Inventors: Kazuyuki Sakoda, Chiba (JP);
Nobuhiko Watanabe, Kanagawa (JP);
Chihiro Fujita, Kanagawa (JP);
Yoshihiko Ikenaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/909,711

(22) PCT Filed: Jul. 3, 2014

(86) PCT No.: PCT/JP2014/067740
§ 371 (c)(1),
(2) Date: Feb. 2, 2016

(87) PCT Pub. No.: WO2015/029592
PCT Pub. Date: Mar. 5, 2015

(65) Prior Publication Data
US 2016/0192275 A1 Jun. 30, 2016

(30) Foreign Application Priority Data
Aug. 27, 2013 (JP) ................................. 2013-175285

(51) Int. Cl.
*H04W 40/24* (2009.01)
*H04W 40/30* (2009.01)
(Continued)

(52) U.S. Cl.
CPC ......... *H04W 40/248* (2013.01); *H04W 40/30* (2013.01); *H04L 45/16* (2013.01); *H04W 84/18* (2013.01)

(58) Field of Classification Search
CPC .... H04L 45/16; H04W 40/248; H04W 40/30; H04W 84/18
See application file for complete search history.

(56) References Cited

U.S. PATENT DOCUMENTS

2004/0143842 A1* 7/2004 Joshi ..................... H04W 24/00
725/32
2005/0036486 A1* 2/2005 Sahinoglu ............. H04W 40/28
370/389

(Continued)

FOREIGN PATENT DOCUMENTS

| JP | 2005-252856 | 9/2005 |
| JP | 2006-033289 | 2/2006 |
| JP | 2009-239385 | 10/2009 |

*Primary Examiner* — Asad Nawaz
*Assistant Examiner* — Zhaohui Yang
(74) *Attorney, Agent, or Firm* — Chip Law Group

(57) ABSTRACT

An information processing device equipped with a communication unit and a control unit. The communication unit exchanges a signal for generation or updating of a multi-hop communication path using wireless communication with another information processing device. In addition, the control unit performs control such that, when there is path information regarding a communication path to another information processing device in a case in which the signal for generation or updating of a multi-hop communication path is transmitted to the other information processing device, the signal is transmitted to the other information processing device in unicast, and the signal is transmitted in broadcast.

10 Claims, 38 Drawing Sheets

(51) Int. Cl.
*H04L 12/761* (2013.01)
*H04W 84/18* (2009.01)

(56) References Cited

U.S. PATENT DOCUMENTS

| | | | |
|---|---|---|---|
| 2008/0095059 A1* | 4/2008 | Chu | H04L 12/66 370/238 |
| 2009/0238109 A1* | 9/2009 | Byard | H04W 40/02 370/328 |
| 2010/0226342 A1* | 9/2010 | Colling | H04W 56/002 370/336 |

* cited by examiner

FIG. 3
MANAGEMENT PACKET
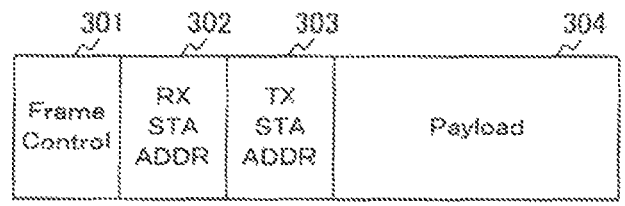
a
DATA PACKET
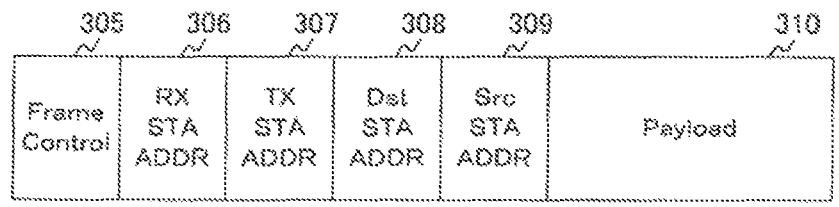
b

FIG. 4
MANAGEMENT PACKET
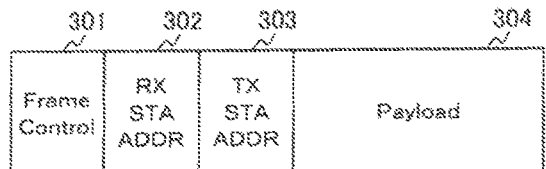
a
RANN(ROOT ANNOUNCEMENT SIGNAL)
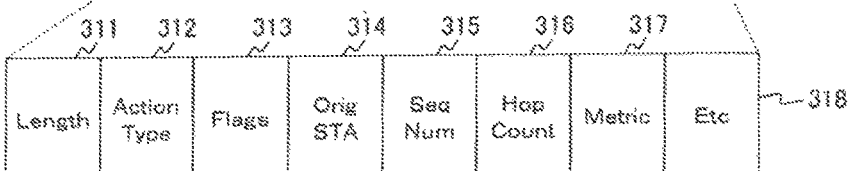
b
PREQ(PATH REQUEST SIGNAL)
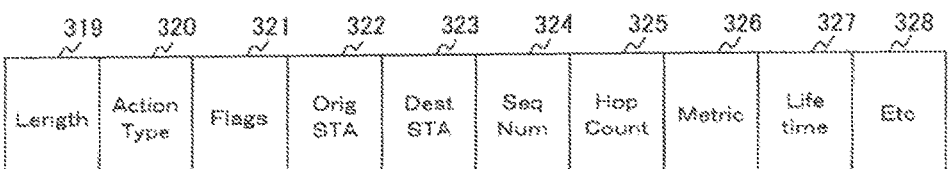
c
PREP(PATH REPLY SIGNAL)
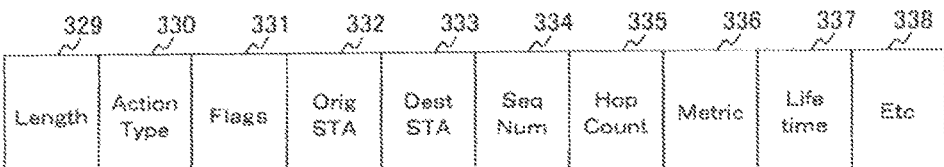
d

FIG. 5

RANN(ROOT ANNOUNCEMENT SIGNAL)

| | | |
|---|---|---|
| 311 | Length | INDICATES LENGTH OF PAYLOAD |
| 312 | Action Type | IDENTIFIER INDICATING THAT THIS SIGNAL IS RANN IS STORED. RECEIVER CAN RECOGNIZE THAT THIS SIGNAL IS RANN REFERRING TO THIS FIELD. |
| 313 | Flags | ATTRIBUTE OF TRANSMISSION SOURCE STATION OF RANN IS STORED. |
| 314 | OrigSTA | IDENTIFIER INDICATING WHICH INFORMATION PROCESSING DEVICE IS TRANSMISSION SOURCE STATION OF RANN IS STORED. ALTHOUGH RANN IS TRANSFERRED TO REMOTE SPOT IN MULTI-HOP RELAY, IT IS POSSIBLE TO RECOGNIZE WHICH INFORMATION PROCESSING DEVICE IS TRANSMISSION SOURCE STATION. |
| 315 | SeqNum | IDENTIFIER FOR IDENTIFYING RANN IS STORED. ALTHOUGH RANN IS TRANSMITTED FROM TRANSMISSION SOURCE STATION, EACH RANN CAN BE IDENTIFIED AS SeqNum IS INCREMENTED IN EACH TRANSMISSION. |
| 316 | HopCount | NUMERICAL VALUE INDICATING NUMBER OF HOPS NECESSARY FOR RANN TO BE DELIVERED FROM TRANSMISSION SOURCE STATION IS STORED. ALTHOUGH INFORMATION PROCESSING DEVICE WHICH HAS RECEIVED RANN TRANSFERS RANN IN MULTI-HOP, VALUE INCREMENTED IN EACH TRANSFER PROCESS IS STORED. |
| 317 | Metric | VALUE INDICATING METRIC VALUE THAT WAS NECESSARY FOR ARRIVAL OF RANN FROM TRANSMISSION SOURCE STATION IS STORED. ALTHOUGH INFORMATION PROCESSING DEVICE WHICH HAS RECEIVED RANN TRANSFERS RANN IN MULTI-HOP, VALUE OBTAINED BY CUMULATIVE ADDITION OF LINK METRIC VALUE IN EACH TRANSFER PROCESS IS STORED. |
| 318 | Etc | OTHER MANAGEMENT INFORMATION |

FIG. 6

PREQ(PATH REQUEST SIGNAL)

| | | |
|---|---|---|
| 319 | Length | INDICATES LENGTH OF PAYLOAD |
| 320 | Action Type | IDENTIFIER INDICATING THAT THIS SIGNAL IS PREQ IS STORED. RECEIVER CAN RECOGNIZE THAT THIS SIGNAL IS PREQ REFERRING TO THIS FIELD. |
| 321 | Flags | INFORMATION INDICATING WHETHER PREQ HAS BEEN TRIGGERED BY RECEPTION OF RANN AND TRANSMITTED (WHETHER IT IS PROACTIVE MESH PATH GENERATION PROCESS) IS STORED. |
| 322 | OrigSTA | IDENTIFIER INDICATING INFORMATION PROCESSING DEVICE SERVING AS REQUESTING SOURCE OF MESH PATH GENERATION (TRANSMISSION SOURCE STATION) IS STORED. ALTHOUGH PREQ IS TRANSFERRED TO REMOTE SPOT IN MULTI-HOP RELAY, IT IS POSSIBLE TO RECOGNIZE WHICH INFORMATION PROCESSING DEVICE IS TRANSMISSION SOURCE STATION. |
| 323 | DestSTA | IDENTIFIER INDICATING INFORMATION PROCESSING DEVICE SERVING AS REQUEST DESTINATION OF MESH PATH GENERATION (DESTINATION STATION) IS STORED. UPON RECEIVING PREQ, INFORMATION PROCESSING DEVICE SPECIFIED BY THIS IDENTIFIER REPLIES WITH PREP IN RESPONSE THERETO. ACCORDINGLY, BI-DIRECTIONAL MESH PATH IS GENERATED. |
| 324 | SeqNum | IDENTIFIER FOR IDENTIFYING PREQ IS STORED. ALTHOUGH PREQ IS TRANSMITTED FROM TRANSMISSION SOURCE STATION PLURALITY OF TIMES, EACH PREQ CAN BE IDENTIFIED AS SeqNum HAS INCREMENTED VALUE IN EACH TRANSMISSION. |
| 325 | HopCount | NUMERICAL VALUE INDICATING NUMBER OF HOPS NECESSARY FOR PREQ TO BE DELIVERED FROM TRANSMISSION SOURCE STATION IS STORED. ALTHOUGH INFORMATION PROCESSING DEVICE WHICH HAS RECEIVED PREQ TRANSFERS PREQ IN MULTI-HOP, VALUE INCREMENTED IN EACH TRANSFER PROCESS IS STORED. |
| 326 | Metric | VALUE INDICATING METRIC VALUE THAT WAS NECESSARY FOR ARRIVAL OF PREQ FROM TRANSMISSION SOURCE STATION IS STORED. ALTHOUGH INFORMATION PROCESSING DEVICE WHICH HAS RECEIVED PREQ TRANSFERS PREQ IN MULTI-HOP, VALUE OBTAINED BY CUMULATIVE ADDITION OF LINK METRIC VALUE IN EACH TRANSFER PROCESS IS STORED. |
| 327 | Lifetime | INFORMATION FOR DESIGNATING LIFETIME OF MESH PATH IS STORED. |
| 328 | Etc | OTHER MANAGEMENT INFORMATION |

FIG. 7

PREP(PATH REPLY SIGNAL)

| | | |
|---|---|---|
| 329 | Length | INDICATES LENGTH OF PAYLOAD |
| 330 | Action Type | IDENTIFIER INDICATING THAT THIS SIGNAL IS PREP IS STORED. RECEIVER CAN RECOGNIZE THAT THIS SIGNAL IS PREP REFERRING TO THIS FIELD. |
| 331 | Flags | ATTRIBUTE OF TRANSMISSION SOURCE OF PREP IS STORED. |
| 332 | OrigSTA | IDENTIFIER INDICATING INFORMATION PROCESSING DEVICE SERVING AS REQUESTING SOURCE OF MESH PATH GENERATION IS STORED. IDENTIFIER OF INFORMATION PROCESSING DEVICE STORED IN OrigSTA OF PREQ IS TRANSCRIBED. |
| 333 | DestSTA | IDENTIFIER INDICATING INFORMATION PROCESSING DEVICE SERVING AS REQUEST DESTINATION OF MESH PATH GENERATION IS STORED. IDENTIFIER OF INFORMATION PROCESSING DEVICE STORED IN DesiSTA OF PREQ IS TRANSCRIBED. |
| 334 | SeqNum | IDENTIFIER FOR IDENTIFYING PREP IS STORED. ALTHOUGH PREP IS TRANSMITTED FROM TRANSMISSION SOURCE STATION PLURALITY OF TIMES, EACH PREP CAN BE IDENTIFIED AS SeqNum IS INCREMENTED IN EACH TRANSMISSION. |
| 335 | HopCount | NUMERICAL VALUE INDICATING NUMBER OF HOPS NECESSARY FOR PREP TO BE DELIVERED FROM TRANSMISSION SOURCE STATION IS STORED. ALTHOUGH INFORMATION PROCESSING DEVICE WHICH HAS RECEIVED PREP TRANSFERS PREP IN MULTI-HOP, VALUE INCREMENTED IN EACH TRANSFER PROCESS IS STORED. |
| 336 | Metric | VALUE INDICATING METRIC VALUE THAT WAS NECESSARY FOR ARRIVAL OF PREP FROM TRANSMISSION SOURCE STATION IS STORED. ALTHOUGH INFORMATION PROCESSING DEVICE WHICH HAS RECEIVED PREP TRANSFERS PREP IN MULTI-HOP, VALUE OBTAINED BY CUMULATIVE ADDITION OF LINK METRIC VALUE IN EACH TRANSFER PROCESS IS STORED. |
| 337 | Lifetime | INFORMATION FOR DESIGNATING LIFETIME OF MESH PATH IS STORED. |
| 338 | Etc | OTHER MANAGEMENT INFORMATION |

FIG. 8

MESH PATH TABLE
340

| Dest | XXX |
|---|---|
| a | NextHop | YYY |
| b | Metric | 999 |
| c | SeqNum | 111 |
| d | ExpTime | 222 | a

CONTENT EXAMPLE OF MESH PATH TABLE

| Index | DATA NAME | MEANING |
|---|---|---|
| a | NextHop | IDENTIFIER OF INFORMATION PROCESSING DEVICE FOR SPECIFYING INFORMATION PROCESSING DEVICE TO WHICH DATA IS TO BE TRANSFERRED NEXT IN ORDER TO DELIVER DATA TO DESTINATION STATION |
| b | Metric | PATH METRIC VALUE FROM SELF-STATION TO DESTINATION STATION OF MESH PATH |
| c | SeqNum | VALUE OF SeqNum OF PREQ OR PREP USED IN GENERATION OF MESH PATH |
| d | ExpTime | EXPIRATION TIME OF MESH PATH DECIDED BASED ON Lifetime OF PREQ OR PREP USED IN CREATION OF MESH PATH | b

FIG. 9
GENERATION EXAMPLE OF REACTIVE MESH PATH
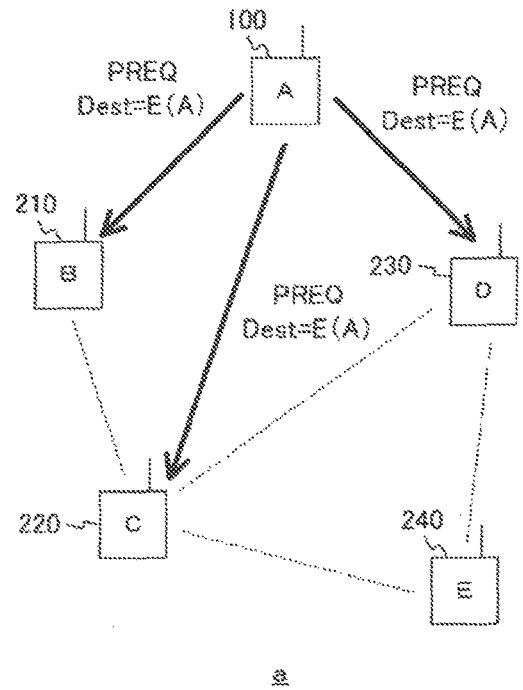
a
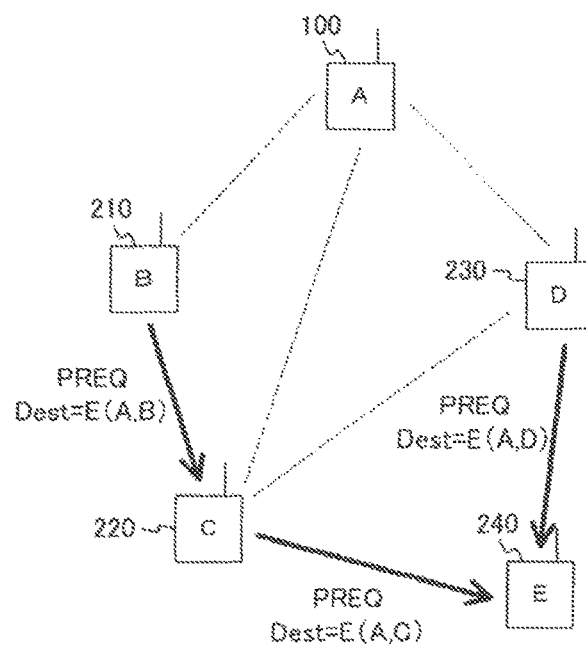
b

FIG. 10
GENERATION EXAMPLE OF REACTIVE MESH PATH
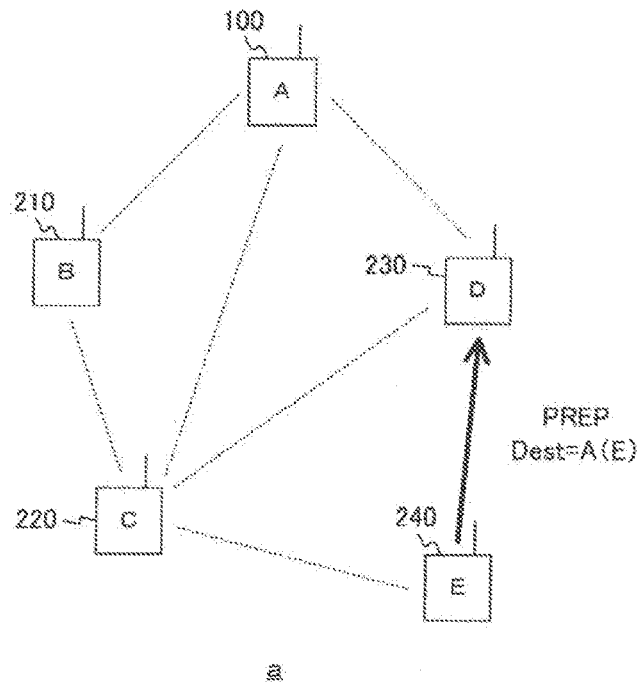
a
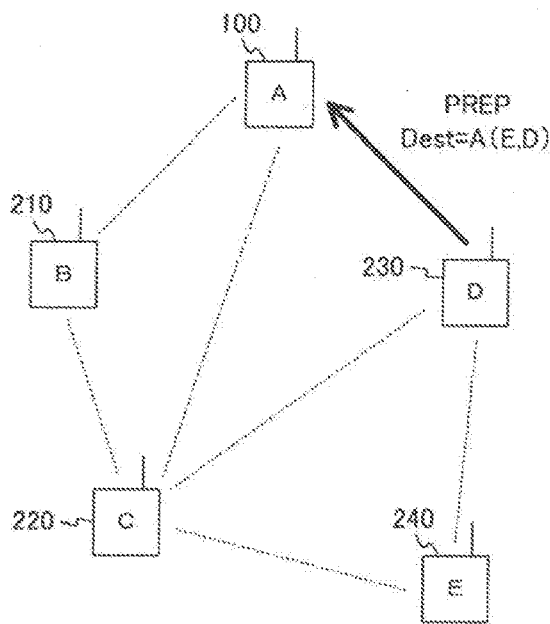
b

FIG. 11
GENERATION EXAMPLE OF PROACTIVE MESH PATH
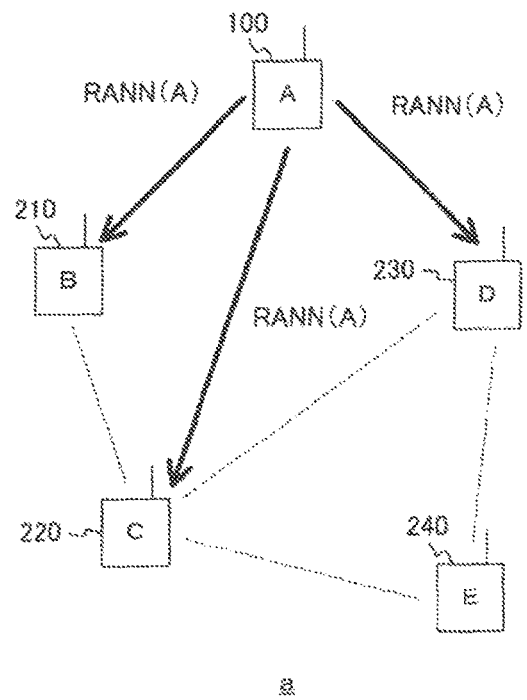
a
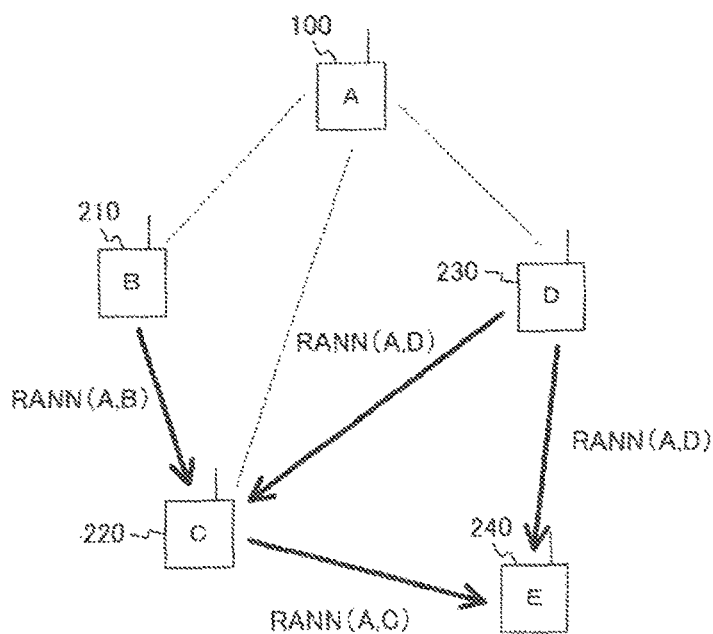
b

FIG. 12
GENERATION EXAMPLE OF PROACTIVE MESH PATH
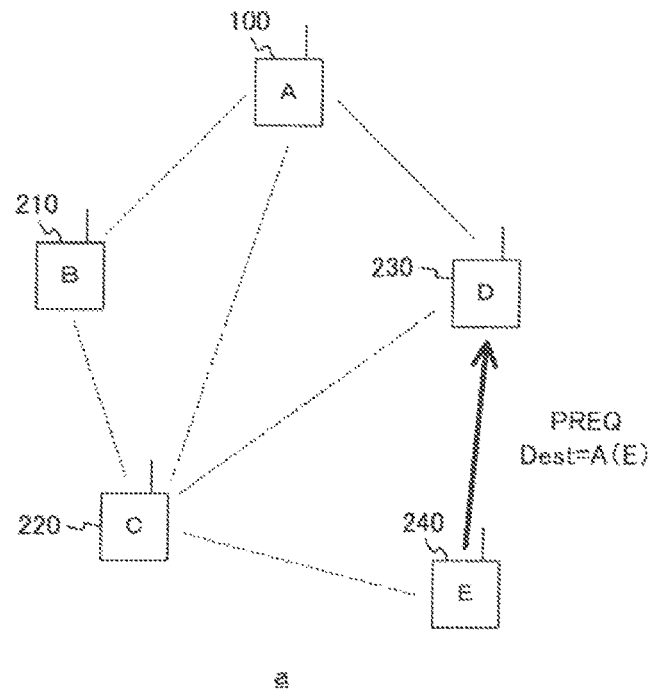
a
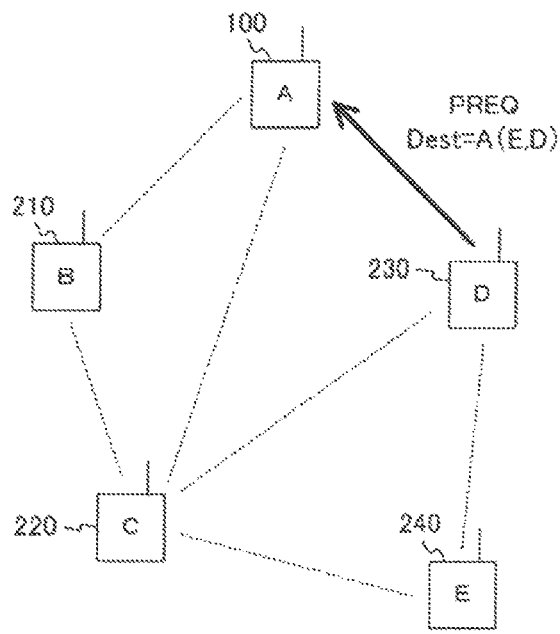
b

FIG. 13
GENERATION EXAMPLE OF PROACTIVE MESH PATH
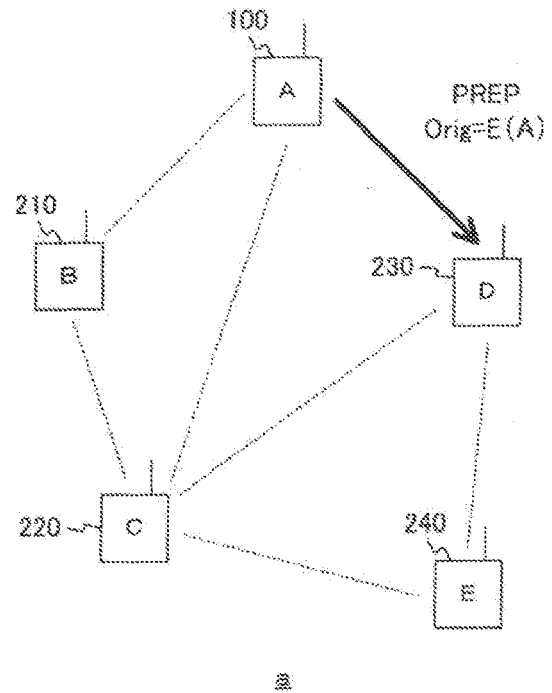
a
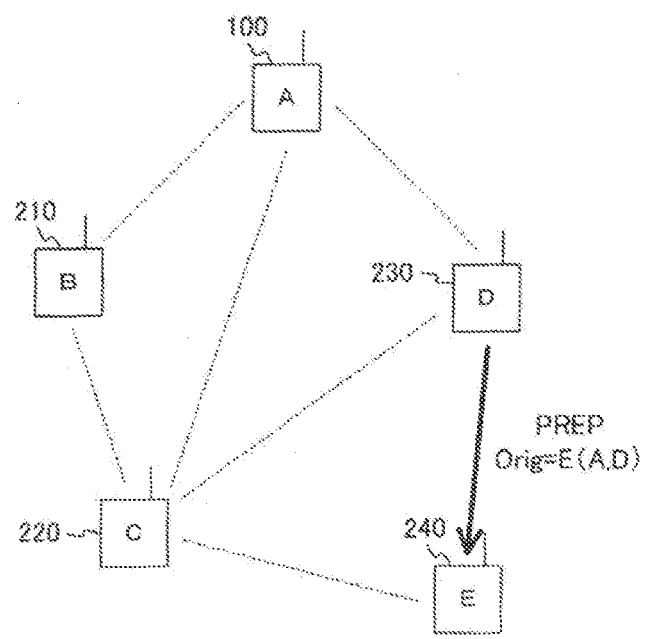
b

FIG. 14
GENERATION EXAMPLE OF REACTIVE MESH PATH
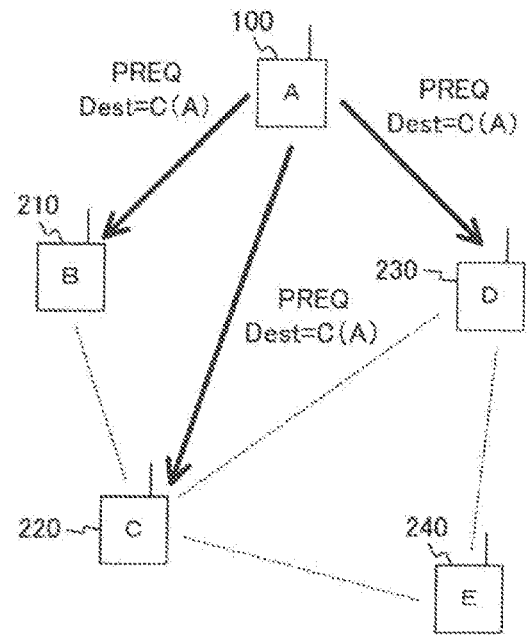
a
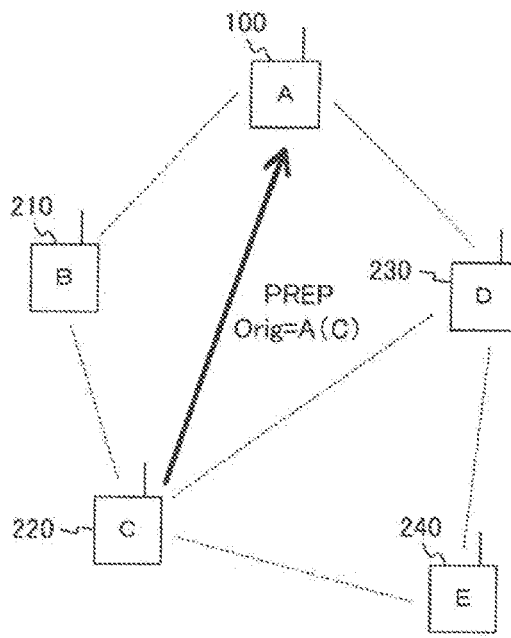
b

FIG. 15  GENERATION EXAMPLE OF REACTIVE MESH PATH
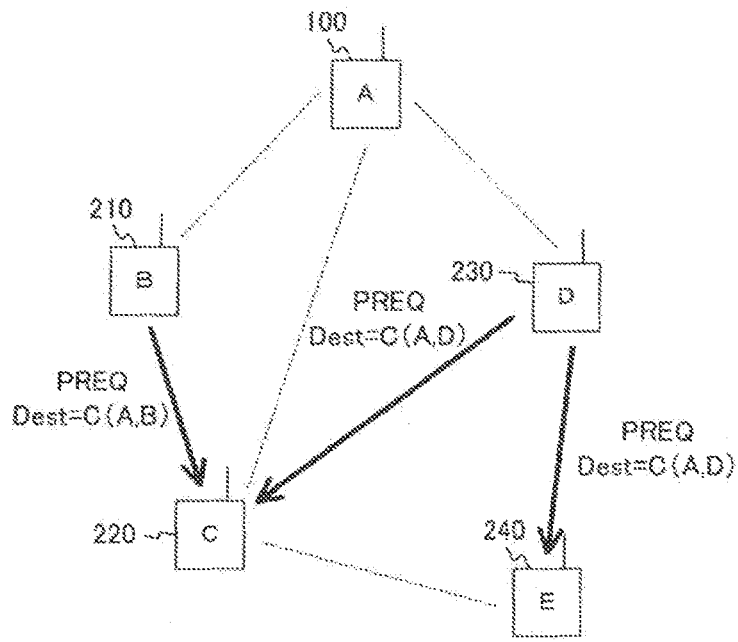
a
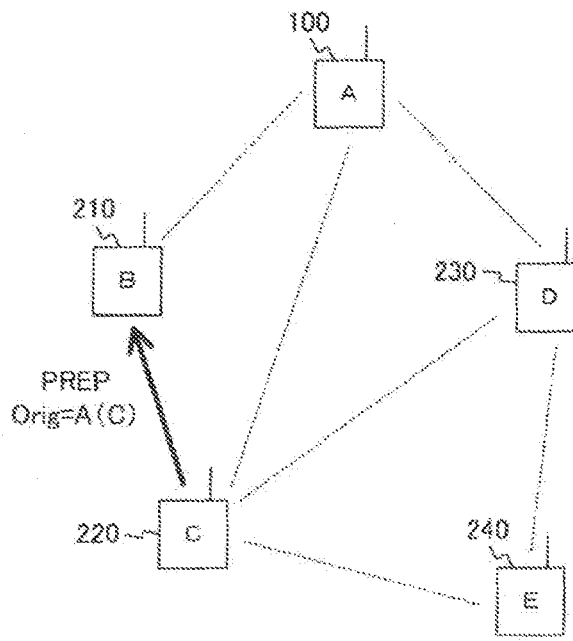
b

FIG. 17 GENERATION EXAMPLE OF PROACTIVE MESH PATH
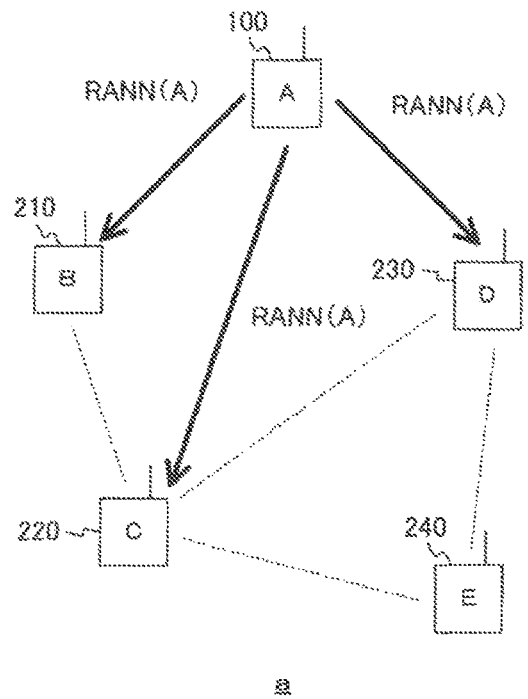
a
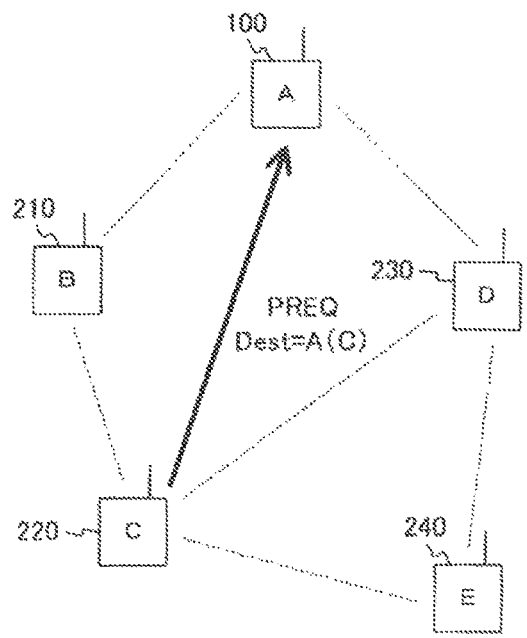
b

FIG. 18  GENERATION EXAMPLE OF PROACTIVE MESH PATH
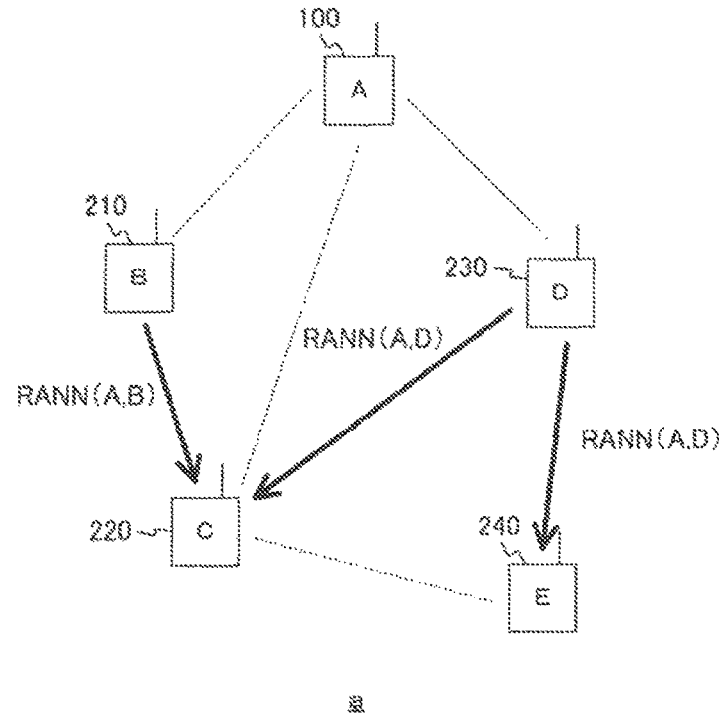
a
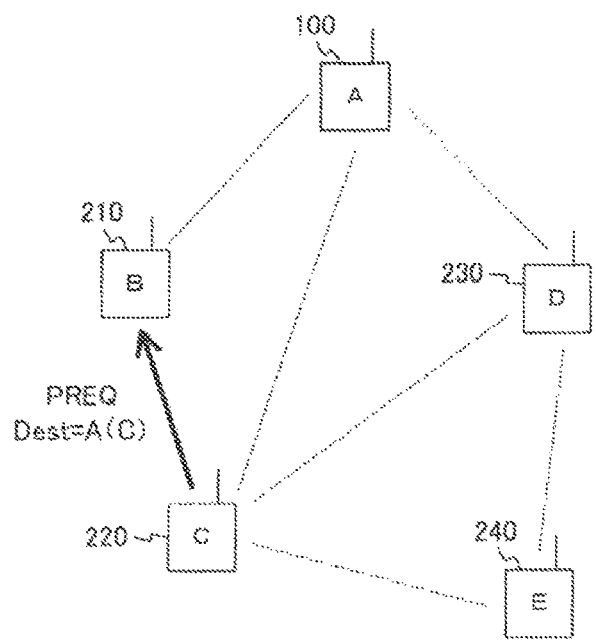
b

EXAMPLE OF VALID MESH PATH

FIG. 20  EXAMPLE OF UPDATING OF VALID MESH PATH
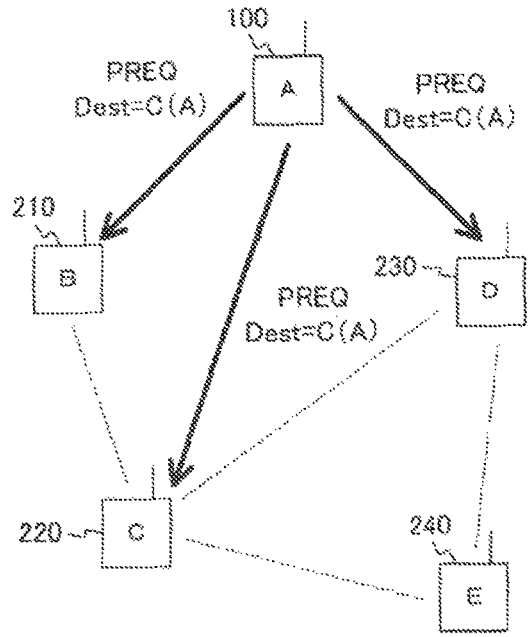
a
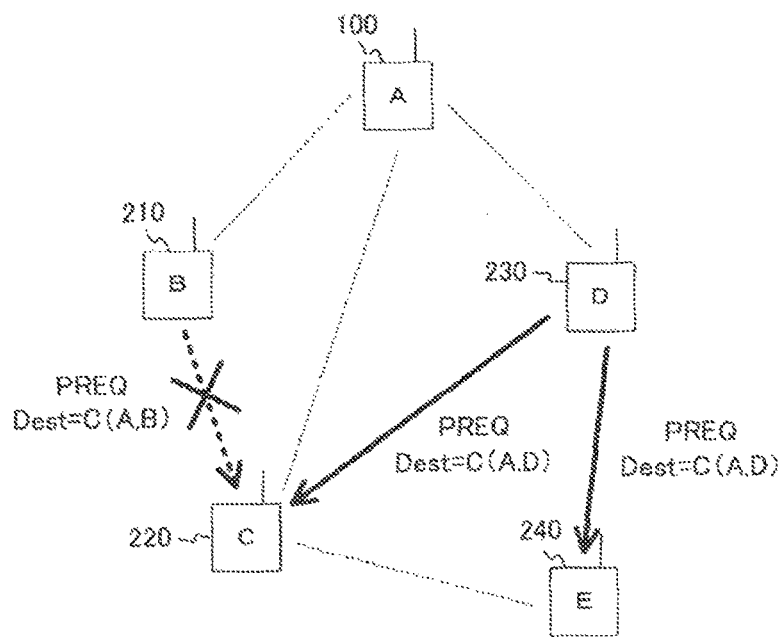
b

FIG. 21

MESH PATH TABLE
350

| | | Dest | XXX |
|---|---|---|---|
| 341 | | Dest | XXX |
| 342 | a | NextHop | YYY |
| 343 | b | Metric | 999 |
| 344 | c | SeqNum | 111 |
| 345 | d | ExpTime | 222 |
| 351 | e | ProactiveFlag | 0 |
| 352 | f | ActReason | 0 |
| 353 | g | Cand. Flag | 1 |
| 354 | h | Cand. NextHop | ZZZ |
| 355 | i | Cand. Metric | 8886 |
| 356 | j | Cand. SeqNum | 222 |
| 357 | k | Cand. ExpTime | 333 |
| 358 | n | Cand. ActReason | 0 |
| 359 | p | Cand. NB. Metric | 222 |
| 360 | q | Cand. NB. ExpTime | 444 |

FIG. 22  EXAMPLE OF CONTENT OF MESH PATH TABLE

| Index | DATA NAME | MEANING |
|---|---|---|
| a | NextHop | IDENTIFIER OF INFORMATION PROCESSING DEVICE FOR SPECIFYING INFORMATION PROCESSING DEVICE TO WHICH DATA IS TO BE TRANSFERRED NEXT IN ORDER TO DELIVER DATA TO DESTINATION STATION |
| b | Metric | PATH METRIC VALUE FROM SELF-STATION TO DESTINATION STATION OF MESH PATH |
| c | SeqNum | VALUE OF SeqNum OF PREQ OR PREP USED IN GENERATION OF MESH PATH |
| d | ExpTime | EXPIRATION TIME OF MESH PATH DECIDED BASED ON Lifetime OF PREQ OR PREP USED IN CREATION OF MESH PATH |
| e | ProactiveFlag | FLAG INDICATING WHETHER OR NOT MESH PATH HAS BEEN PROACTIVELY GENERATED |
| f | ActReason | VALUE INDICATING POSITION OF SELF-DEVICE ON MESH PATH (VALUE INDICATING WHETHER SELF-DEVICE WAS OrigSTA, DestSTA, OR RELAY NODE OF CERTAIN NUMBER OF HOPS FROM OrigSTA WHEN MESH PATH WAS GENERATED) |
| g | Cand. Flag | FLAG INDICATING WHETHER OR NOT INFORMATION AFTER h IS VALID |
| h | Cand. NextHop | IDENTIFIER OF INFORMATION PROCESSING DEVICE DETERMINED TO BE NextHop CANDIDATE TOWARD DESTINATION STATION (THAT IS, OrigSTA OF PREQ (OR RANN)) OF THIS RECORD WHEN PREQ (OR RANN) HAS BEEN RECEIVED |
| i | Cand. Metric | PATH METRIC VALUE COMPUTED WHEN PREQ (OR RANN) HAS BEEN RECEIVED (THAT IS, PATH METRIC VALUE TO DESTINATION STATION (THAT IS, OrigSTA OF PREQ (OR RANN) OF THIS RECORD) |
| j | Cand. SeqNum | VALUE OF SeqNum OF PREQ (OR RANN) USED WHEN THIS RECORD IS CREATED |
| k | Cand. ExpTime | EXPIRATION TIME DECIDED BASED ON Lifetime OF PREQ USED WHEN THIS RECORD IS CREATED |
| n | Cand. ActReason | VALUE INDICATING POSITION OF SELF-DEVICE ON MESH PATH (VALUE INDICATING WHETHER SELF-DEVICE WAS OrigSTA, DestSTA, OR RELAY NODE OF CERTAIN NUMBER OF HOPS FROM OrigSTA WHEN MESH PATH WAS GENERATED) |
| p | Cand. NB. Metric | LINK METRIC VALUE BETWEEN TRANSMITTING STATION OF PREQ (OR RANN) USED WHEN THIS RECORD IS CREATED |
| q | Cand. NB. ExpTime | EXPIRATION TIME DECIDED BASED ON Lifetime OF PREQ USED WHEN THIS RECORD IS CREATED |

FIG. 23

EXAMPLE OF UPDATING OF MESH PATH TABLE

| Index | DATA NAME | CONTENT OF UPDATING |
|---|---|---|
| 351 — e | ProactiveFlag | WHEN Flags FIELD OF PREQ INDICATES PROACTIVE MESH PATH GENERATION PROCESS, OR WHEN BROADCAST IS DESIGNATED IN DestSTA FIELD, TrueValue IS STORED, AND IN OTHER CASES, FalseValue IS STORED. |
| 353 — g | Cand. Flag | SET INDICATION THAT INFORMATION IS VALID (TrueValue IS STORED) |
| 354 — h | Cand. NextHop | IDENTIFIER OF TX STA ADDR FIELD OF PREQ IS STORED. |
| 355 — i | Cand. Metric | COMPUTED PATH METRIC VALUE IS STORED. |
| 356 — j | Cand. SeqNum | VALUE OF SeqNum OF PREQ IS STORED. |
| 357 — k | Cand. ExpTime | VALUE OBTAINED BY ADDING CURRENT TIME TO VALUE OF Lifetime OF PREQ IS STORED. |
| 358 — n | Cand. ActReason | WHEN SELF-DEVICE IS DestSTA OF PREQ, 2 IS STORED (REFRESHING PROCESS IS SET TO BE TRIGGERED SECOND EARLIEST), AND IN OTHER CASES, VALUE OF HopCount OF PREQ × 2 + 4 IS STORED. | a

EXAMPLE OF UPDATING OF MESH PATH TABLE

| Index | DATA NAME | CONTENT OF UPDATING |
|---|---|---|
| 353 — g | Cand. Flag | SET INDICATION THAT INFORMATION IS VALID (TrueValue IS STORED) |
| 359 — p | Cand. NB. Metric | LINK METRIC VALUE BETWEEN TRANSMITTING STATION OF PREQ AND SELF-STATION IS STORED. |
| 360 — q | Cand. NB. ExpTime | VALUE OBTAINED BY ADDING CURRENT TIME TO VALUE OF Lifetime OF PREQ IS STORED. | b

FIG. 25

EXAMPLE OF UPDATING OF MESH PATH TABLE

| Index | DATA NAME | CONTENT OF UPDATING |
|---|---|---|
| 342 — a | NextHop | TX STA ADDR FIELD OF PREP IS STORED. |
| 343 — b | Metric | PATH METRIC VALUE COMPUTED BY ADDING LINK METRIC VALUE BETWEEN SELF-STATION AND TRANSMITTING STATION TO VALUE OF Metric FIELD OF PREP IS STORED. |
| 344 — c | SeqNum | VALUE OF SeqNum OF PREP IS STORED. |
| 345 — d | ExpTime | VALUE OBTAINED BY ADDING CURRENT TIME TO Lifetime OF PREP IS STORED. |
| 352 — f | ActReason | WHEN SELF-DEVICE IS OrigSTA OF PREP, 1 IS STORED (REFRESHING PROCESS IS SET TO BE TRIGGERED AS EARLY AS POSSIBLE), AND IN OTHER CASES, VALUE OF HopCount OF PREP × 2 + 3 IS STORED. |
| 353 — g | Cand. Flag | INDICATION THAT INFORMATION IS INVALID IS SET (FalseValue IS STORED). |
| 356 — j | Cand. SeqNum | SAME VALUE AS SeqNum OF "c" OF Index (VALUE OF SeqNum OF PREP) IS STORED. | a

EXAMPLE OF UPDATING OF MESH PATH TABLE

| Index | DATA NAME | CONTENT OF UPDATING |
|---|---|---|
| 342 — a | NextHop | TX STA ADDR FIELD OF PREP IS STORED. |
| 343 — b | Metric | LINK METRIC VALUE BETWEEN SELF-STATION AND TRANSMITTING STATION IS STORED. |
| 344 — c | SeqNum | INVALID VALUE IS STORED. |
| 345 — d | ExpTime | VALUE OBTAINED BY ADDING CURRENT TIME TO VALUE OF Lifetime OF PREP IS STORED. |
| 352 — f | ActReason | 0 IS STORED (REFRESHING PROCESS IS SET TO BE TRIGGERED AS LATE AS POSSIBLE). |
| 353 — g | Cand. Flag | INDICATION THAT INFORMATION IS INVALID IS SET (FalseValue IS STORED). |
| 356 — j | Cand. SeqNum | SAME VALUE AS SeqNum OF "c" OF Index (VALUE OF SeqNum OF PREP) IS STORED. | b

FIG. 26

EXAMPLE OF UPDATING OF MESH PATH TABLE

| Index | DATA NAME | CONTENT OF UPDATING |
|---|---|---|
| 342 — a | NextHop | VALUE OF Cand. NextHop OF THIS RECORD IS TRANSCRIBED. |
| 343 — b | Metric | VALUE OF Cand. Metric OF THIS RECORD IS TRANSCRIBED. |
| 344 — c | SeqNum | VALUE OF Cand. SeqNum OF THIS RECORD IS TRANSCRIBED. |
| 345 — d | ExpTime | VALUE OF Cand. ExpTime OF THIS RECORD IS TRANSCRIBED. |
| 352 — f | ActReason | VALUE OF Cand. ActReason OF THIS RECORD IS TRANSCRIBED. |
| 353 — g | Cand. Flag | INDICATION THAT INFORMATION IS INVALID IS SET (FalseValue IS STORED). | a

EXAMPLE OF UPDATING OF MESH PATH TABLE

| Index | DATA NAME | CONTENT OF UPDATING |
|---|---|---|
| 342 — a | NextHop | NextHop OF RECORD USING OrigSTA OF PREP AS KEY |
| 343 — b | Metric | VALUE OF Cand. NB. Metric OF THIS RECORD IS TRANSCRIBED. |
| 344 — c | SeqNum | INVALID VALUE IS STORED. |
| 345 — d | ExpTime | VALUE OF Cand. NB. ExpTime OF THIS RECORD IS TRANSCRIBED. |
| 352 — f | ActReason | 0 IS STORED (REFRESHING PROCESS IS SET TO BE TRIGGERED AS LATE AS POSSIBLE). |
| 353 — g | Cand. Flag | INDICATION THAT INFORMATION IS INVALID IS SET (FalseValue IS STORED). |
| 356 — j | Cand. SeqNum | SAME VALUE AS SeqNum OF "c" OF Index (VALUE OF SeqNum OF PREP) IS STORED. | b

FIG. 29

| VALUE OF ActReason | THRESHOLD VALUE X' AFTER ADJUSTMENT |
|---|---|
| 0 | X' = X (NO ADJUSTMENT ON THRESHOLD VALUE) |
| 1 | X' = X + 800msec |
| 2 | X' = X + 400msec |
| VALUE EQUAL TO OR GREATER THAN 3 | X' = min(X + (20 × VALUE OF ActReason), 300) |

FIG. 30

EXAMPLE OF UPDATING OF MESH PATH TABLE

| Index | DATA NAME | CONTENT OF UPDATING |
|---|---|---|
| 351 — e | ProactiveFlag | TrueValue IS STORED (OPTIONAL). |
| 353 — g | Cand. Flag | INDICATION THAT INFORMATION IS VALID IS SET (TrueValue IS STORED). |
| 354 — h | Cand. NextHop | TX STA ADDR FIELD OF RANN IS STORED. |
| 355 — i | Cand. Metric | COMPUTED PATH METRIC VALUE IS STORED. |
| 356 — j | Cand. SeqNum | VALUE OF SeqNum OF RANN IS STORED. |

FIG. 32  EXAMPLE OF UPDATING OF VALID MESH PATH
UNICAST TRANSMISSION OF PREQ
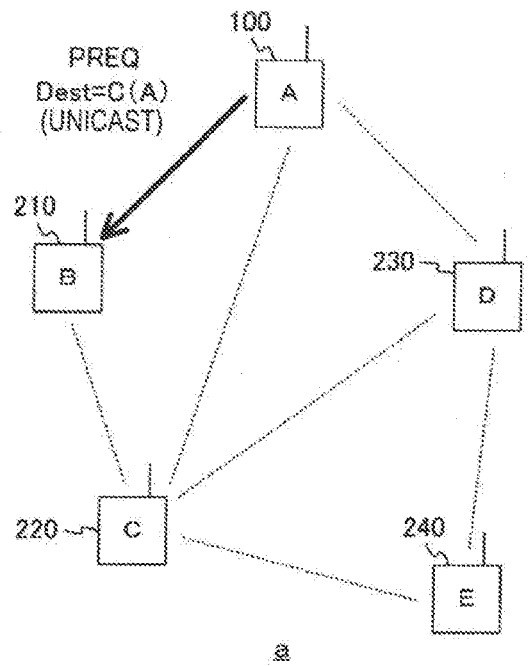
a
BROADCAST TRANSMISSION OF PREQ
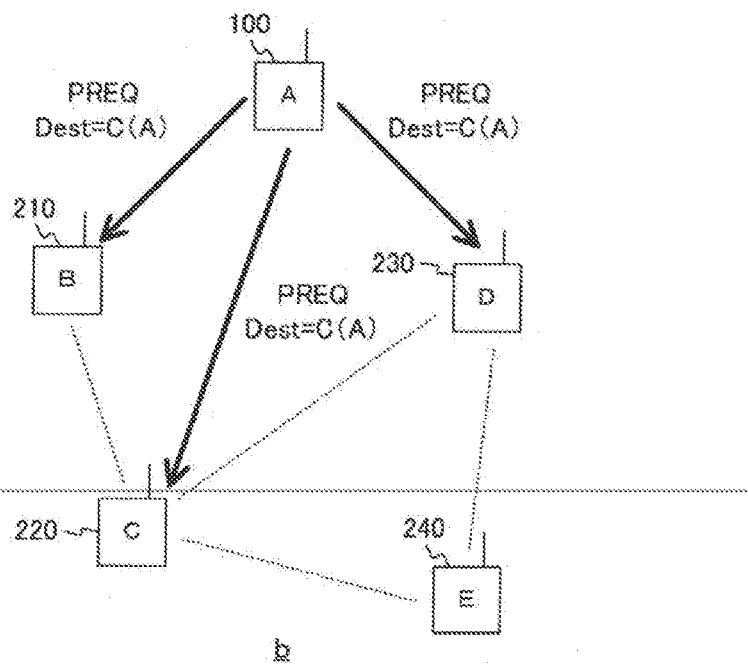
b

FIG. 33  EXAMPLE OF UPDATING OF VALID MESH PATH
UNICAST TRANSMISSION OF PREQ
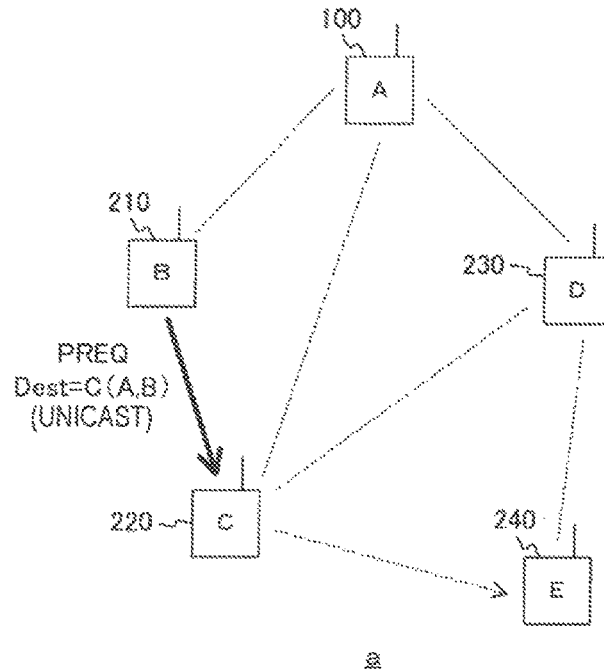
a
BROADCAST TRANSMISSION OF PREQ
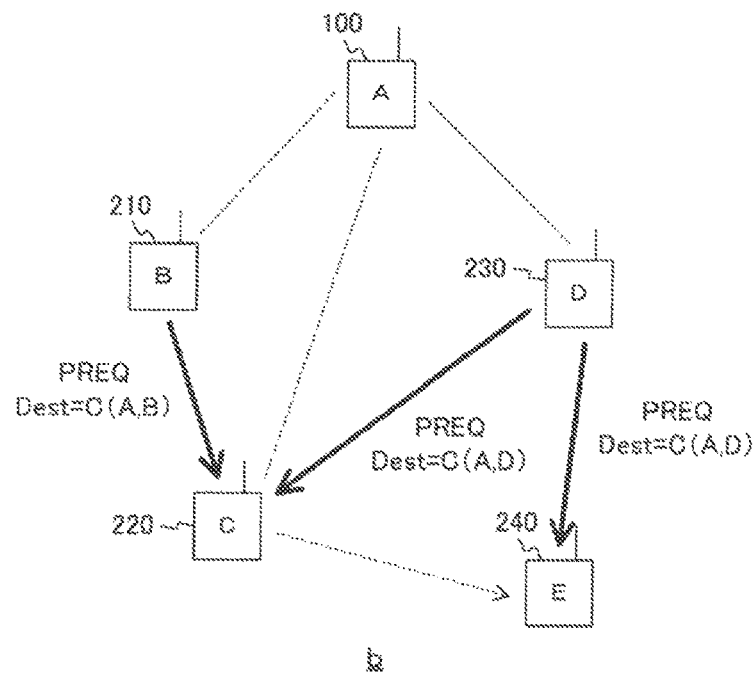
b

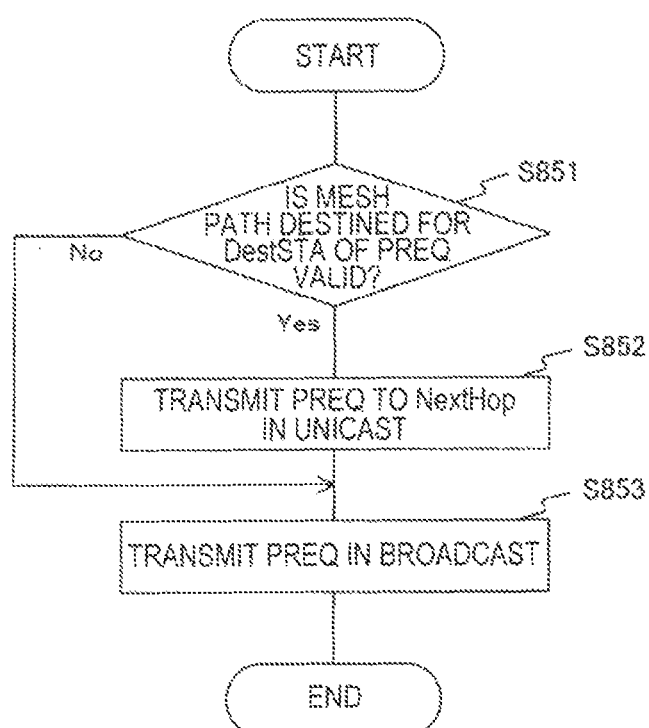

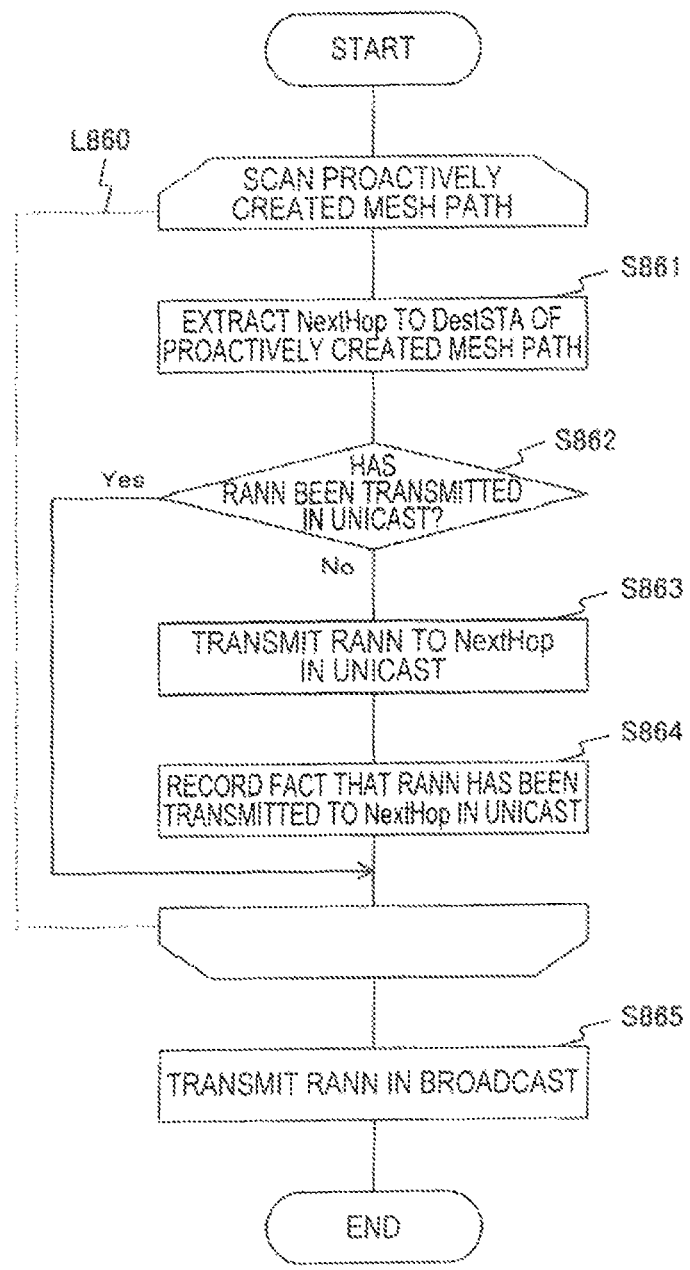

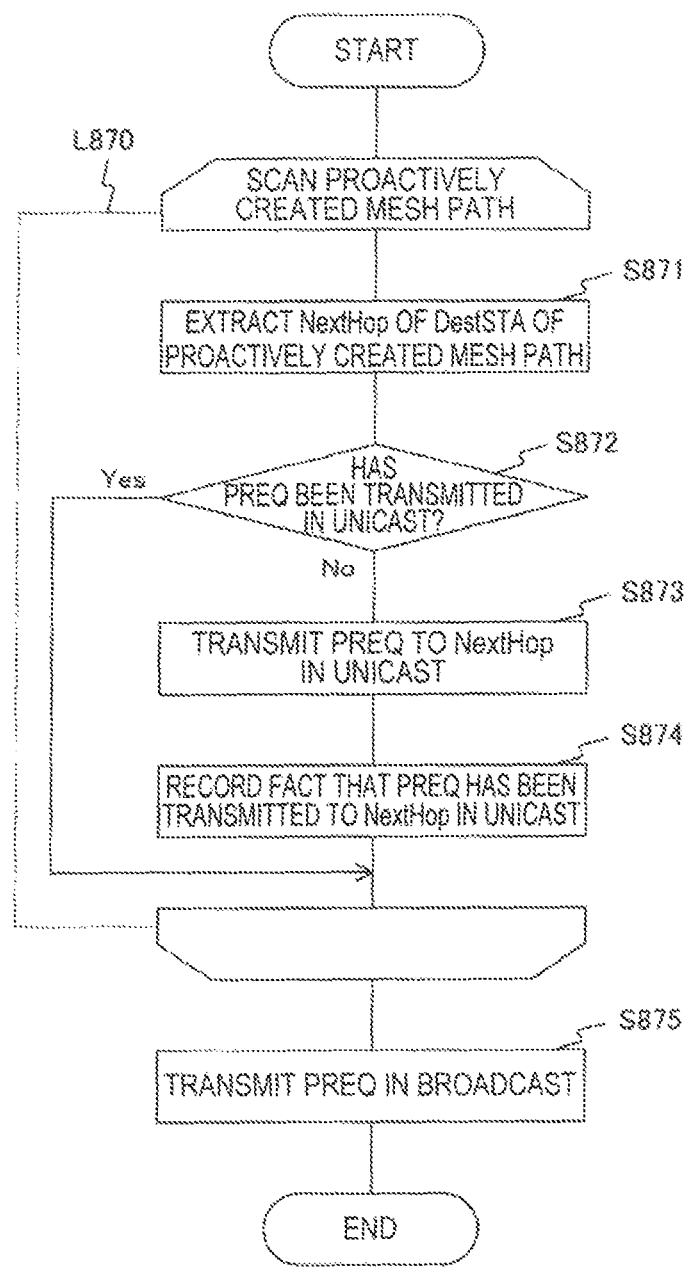

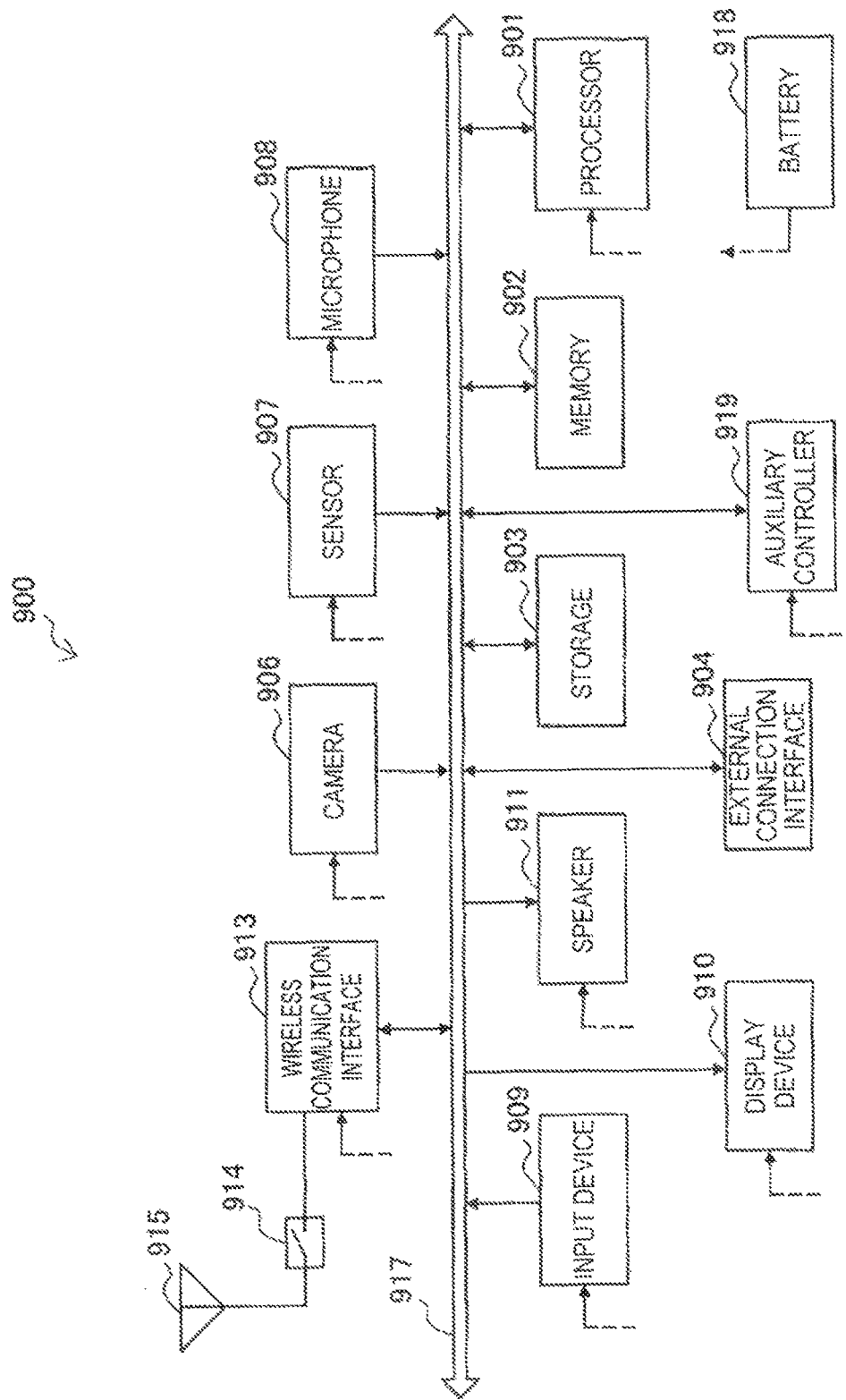

GENERATION AND MANAGEMENT OF COMMUNICATION PATHS BETWEEN INFORMATION PROCESSING DEVICES

TECHNICAL FIELD

The present technology relates to an information processing device. Particularly, the technology relates to an information processing device and an information processing method for dealing with information regarding wireless communication.

BACKGROUND ART

In the related art, there are wireless communication technologies for exchanging various kinds of data using wireless communication. For example, a communication method for making an autonomous connection with a nearby information processing device (for example, ad hoc communication or an ad hoc network) has been proposed (for example, see Patent Literature 1).

CITATION LIST

Non-Patent Literature

Patent Literature 1: JP 2009-239385A

SUMMARY OF INVENTION

Technical Problem

According to the technology of the related art mentioned above, various kinds of data can be exchanged between two information processing devices using wireless communication, without connection on a wired network. In addition, on such a network, each information processing device can perform communication with a nearby information processing device, without depending on a master station such as a control device. Furthermore, on an ad hoc network, when a new information processing device appears nearby, this new information processing device can also freely participate in the network. Thus, network coverage can be widened in accordance with an increase of nearby information processing devices.

In addition, on top of such an autonomous connection with a nearby information processing device, each information processing device can also transfer information to be exchanged with another information processing device in a bucket brigade manner (which is so-called multi-hop relay). In addition, a network using multi-hop is generally known as a mesh network.

As described above, on an ad hoc network or a mesh network, it is possible to freely communicate with nearby information processing devices. In addition, the network can be expanded while connections with information processing devices around are being made. In this case, it is important to appropriately generate and manage a communication path between the plurality of information processing devices.

The present technology takes the above circumstances into consideration, and aims to properly generate and manage a communication path between a plurality of information processing devices.

Solution to Problem

The present technology has been made in order to solve the above-mentioned issues. According to a first aspect of the present technology, there is provided an information processing device, an information processing method, and a program for causing a computer to execute the method, the information processing device including a communication unit configured to perform exchange of a signal for generation or updating of a multi-hop communication path using wireless communication with another information processing device; and a control unit configured to perform control in a manner that, when there is path information regarding a communication path to another information processing device in a case in which the signal is transmitted to the other information processing device, the signal is transmitted to the other information processing device in unicast, and the signal is transmitted in broadcast. Accordingly, the effect that the signal is transmitted in unicast when there is the path information regarding the communication path to the other information processing device in the case in which the signal is transmitted to the other information processing device, and the signal is transmitted in broadcast is exhibited.

According to the first aspect, the control unit may transmit the signal in broadcast when there is no path information regarding the communication path to the other information processing device. Accordingly, the effect that the signal is transmitted in broadcast when there is no path information regarding the communication path to the other information processing device is exhibited.

According to the first aspect, when a communication path which has been proactively generated is set and a signal for updating the communication path is transmitted, the control unit may transmit the signal in unicast to an information processing device serving as a next destination specified with path information regarding the communication path and transmit the signal in broadcast. Accordingly, the effect that the signal is transmitted in unicast to a next destination information processing device specified with the path information regarding the communication path when the communication path which has been proactively generated is set and the signal for updating the communication path is transmitted, and the signal is transmitted in broadcast is exhibited.

According to the first aspect, when a path request signal of which a destination is the information processing device has been received as the signal, the control unit may cause a path reply signal corresponding to the path request signal to be transmitted in the unicast and the broadcast to a transmission source station which is an information processing device which has transmitted the path request signal first at a timing at which a predetermined period of time elapses from reception of the path request signal. Accordingly, the effect that, when the path request signal of which the destination is the information processing device has been received, the path reply signal corresponding to the path request signal is transmitted in unicast and broadcast to the transmission source station of the path request signal at the timing at which the predetermined period of time elapses from reception of the path request signal, is exhibited.

Advantageous Effects of Invention

According to the present technology the excellent effect of appropriately generating and managing communication paths between a plurality of information processing devices can be exhibited. It should be noted that the effect described here is not necessarily limitative, and any effect described in the present disclosure may be exhibited.

BRIEF DESCRIPTION OF DRAWINGS

FIG. 3 is a diagram showing an example of a signal format of a packet exchanged between information processing devices which constitute the communication system 200 according to the first embodiment of the present technology.

FIG. 4 is a diagram showing examples of signal formats of a management packet exchanged between the information processing devices which constitute the communication system 200 according to the first embodiment of the present technology.

FIG. 5 is a diagram showing an example of the content of the signal format of the management packet exchanged between the information processing devices which constitute the communication system 200 according to the first embodiment of the present technology.

FIG. 6 is a diagram showing an example of the content of the signal format of the management packet exchanged between the information processing devices which constitute the communication system 200 according to the first embodiment of the present technology.

FIG. 7 is a diagram showing an example of the content of the signal format of the management packet exchanged between the information processing devices which constitute the communication system 200 according to the first embodiment of the present technology.

FIG. 8 is a diagram schematically showing an example of a mesh path table (mesh path table 340) retained by each of information processing devices which constitute the communication system 200 according to the first embodiment of the present technology.

FIG. 9 is a diagram showing a generation example of a reactive mesh path retained by each of the information processing devices which constitute the communication system 200 according to the first embodiment of the present technology.

FIG. 10 is a diagram showing a generation example of a reactive mesh path retained by each of the information processing devices which constitute the communication system 200 according to the first embodiment of the present technology.

FIG. 11 is a diagram showing an example of generation of a proactive mesh path by each of the information processing devices which constitute the communication system 200 according to the first embodiment of the present technology.

FIG. 12 is a diagram showing an example of generation of a proactive mesh path by each of the information processing devices which constitute the communication system 200 according to the first embodiment of the present technology.

FIG. 13 is a diagram showing an example of generation of a proactive mesh path by each of the information processing devices which constitute the communication system 200 according to the first embodiment of the present technology.

FIG. 14 is a diagram showing a generation example of a reactive mesh path retained by each of the information processing devices which constitute the communication system 200 according to the first embodiment of the present technology.

FIG. 15 is a diagram showing a generation example of a reactive mesh path retained by each of the information processing devices which constitute the communication system 200 according to the first embodiment of the present technology.

FIG. 17 is a diagram showing an example of generation of a proactive mesh path by each of the information processing devices which constitute the communication system 200 according to the first embodiment of the present technology.

FIG. 18 is a diagram showing an example of generation of a proactive mesh path by each of the information processing devices which constitute the communication system 200 according to the first embodiment of the present technology.

FIG. 20 is a diagram schematically showing the flow of data when the information processing device 100 according to the first embodiment of the present technology updates the valid mesh path.

FIG. 21 is a diagram schematically showing an example of a mesh path table (mesh path table 350) retained by each of the information processing devices which constitute the communication system 200 according to the first embodiment of the present technology.

FIG. 22 is a diagram schematically showing the example of the mesh path table (mesh path table 350) retained by each of the information processing devices which constitute the communication system 200 according to the first embodiment of the present technology.

FIG. 23 is diagram showing an example of updating of the mesh path table 350 retained by the information processing device 100 according to the first embodiment of the present technology.

FIG. 25 is diagram showing an example of updating of the mesh path table 350 retained by the information processing device 100 according to the first embodiment of the present technology.

FIG. 26 is diagram showing an example of updating of the mesh path table 350 retained by the information processing device 100 according to the first embodiment of the present technology.

FIG. 29 is a diagram showing a threshold value used when the information processing device 100 according to the first embodiment of the present technology adjusts a transmission trigger of a PREQ.

FIG. 30 is diagram showing an example of updating of the mesh path table 350 retained by the information processing device 100 according to the first embodiment of the present technology.

FIG. 32 is a diagram showing an example of transmission of PREQ by each of the information processing devices which constitute the communication system 200 according to a second embodiment of the present technology.

FIG. 33 is a diagram showing an example of transmission of PREQ by each of the information processing devices which constitute the communication system 200 according to a second embodiment of the present technology.

FIG. 34 is a flowchart showing the process procedure of signal processing by the information processing device 100 according to the second embodiment of the present technology.

FIG. 35 is a flowchart showing the process procedure of signal processing by the information processing device 100 according to the second embodiment of the present technology.

FIG. 36 is a flowchart showing the process procedure of signal processing by the information processing device 100 according to the second embodiment of the present technology.

FIG. 37 is a block diagram showing an example of a schematic configuration of a smartphone.

DESCRIPTION OF EMBODIMENTS

Hereinafter, preferred embodiments for implementing the present technology (which will be referred to hereinafter as embodiments) will be described. Description will be provided in the following order.

1. First embodiment (Example in which a timing at which a mesh path is to be updated is delayed at the time of reception of a signal)
2. Second embodiment (Example in which a signal is transmitted in unicast and broadcast)
3. Application example

1. First Embodiment

[Configuration Example of a Communication System]

Figure 1:
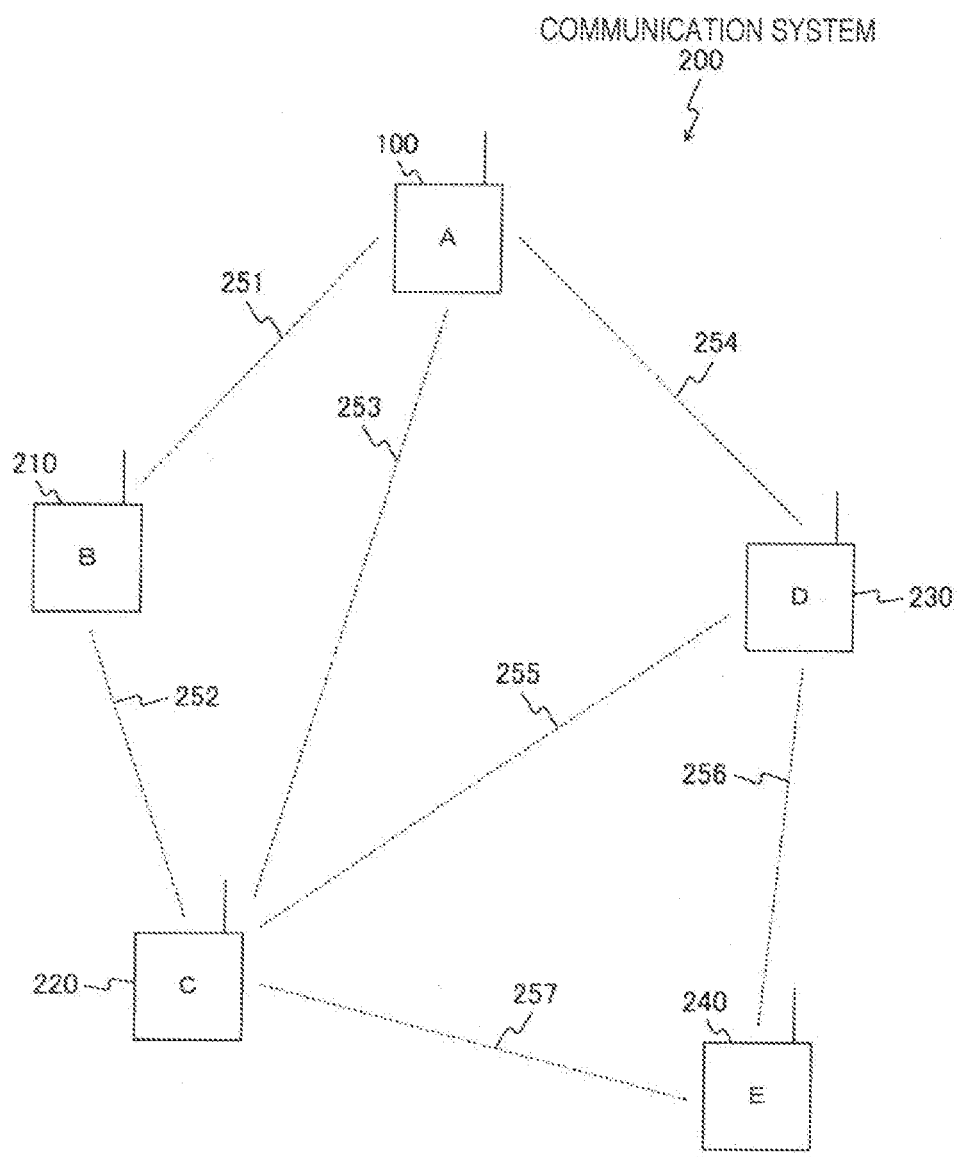
FIG. 1 is a diagram showing a system configuration example of a communication system 200 according to a first embodiment of the present technology.

FIG. 1 is a diagram showing a system configuration example of a communication system 200 according to a first embodiment of the present technology.

The communication system 200 includes a plurality of information processing devices (an information processing device 100, an information processing device 210, an information processing device 220, an information processing device 230, and an information processing device 240). Each of the information processing devices constituting the communication system 200 is, for example, a portable type information processing device or a fixed type information processing device with a wireless communication function. It should be noted that portable type information processing devices include wireless communication devices, for example, smartphones, mobile telephones, tablet terminals, and fixed type information processing devices include information processing devices such as printers, personal computers, and the like.

In FIG. 1 rectangles representing the information processing devices are labeled with reference symbols (A to E) for identifying the respective information processing devices. In other words, the rectangle representing the information processing device 100 is labeled "A," the rectangle representing the information processing device 210 is labeled "B," the rectangle representing the information processing device 220 is labeled "C," the rectangle representing the information processing device 230 is labeled "D," and the rectangle representing the information processing device 240 is labeled "E." In addition, the reference symbols A to E are used to display the content of signals exchanged between the information processing devices as shown in FIGS. 9 to 20, and the like.

In addition, FIG. 1 shows communication paths between the information processing device 100 and the information processing devices 210, 220, and 230 using dotted lines 251, 253, and 254. In addition, communication paths between the other information processing devices are likewise indicated using dotted lines 252 and 255 to 257.

Here, as a communication method for autonomously connecting with a nearby information processing device, ad hoc communication, an ad hoc network, and the like are known. On such a network, each information processing device can perform communication with a nearby information processing device without depending on a master station (for example, a control device). Thus, in this embodiment of the present technology, an ad hoc network will be exemplified as a communication method for autonomously connecting with a nearby information processing device When a new nearby information processing device is added on an ad hoc network, this new information processing device can freely participate in the network. For example, a case in which, among the information processing devices shown in FIG. 1, only the information processing device 100, the information processing device 210, the information processing device 220 first participate in the ad hoc network is assumed. In this case, the information processing device 230 and the information processing device 240 are assumed to be added in order. In this case, as the number of the information processing devices (nearby information processing devices) increases, coverage of the network can be widened. That is, according to the addition of the information processing device 230 and the information processing device 240 in order, coverage of the network can be widened.

Here, on top of autonomous connection with a nearby information processing device, each information processing device can also transfer information to be exchanged with another information processing device in a bucket brigade manner.

It is assumed that, for example, the information processing device 100 can directly communicate with each of the information processing devices 210, 220, and 230, but is not able to directly communicate with the information processing device 240 for a reason such as radio waves failing to reach the device.

When direct communication is not possible as described above, the information processing devices which can directly communicate with the information processing device 100 (the information processing devices 210, 220, and 230) can transfer data of the information processing device 100 to the information processing device 240. Thus, such transfer of data enables the information processing device 100 and the information processing device 240 which does not directly communicate with the information processing device 100 to exchange information via any of the information processing devices 210, 220, and 230.

This method of performing data transfer between devices (so-called bucket brigade) as described above to cause information to reach a remote information processing device is called multi-hop relay. In addition, a network which performs multi-hop is generally known as a mesh network.

Figure 2:
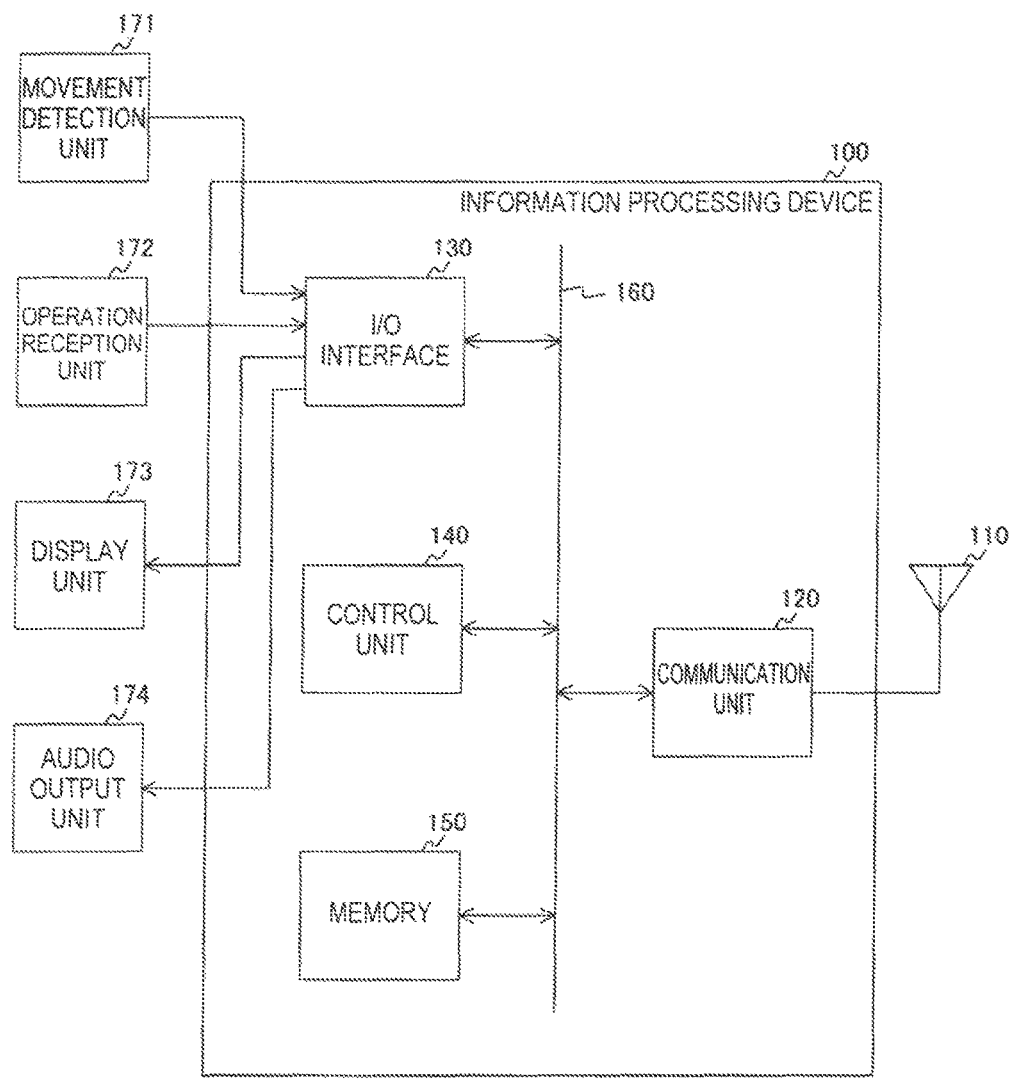
FIG. 2 is a block diagram showing an internal configuration example of an information processing device 100 according to the first embodiment of the present technology.

A configuration of an information processing device which constitutes such an ad hoc network or a mesh network is shown in FIG. 2. In addition, multi-hop relay will be described in more detail with reference to FIGS. 4 to 20, and the like.

In addition, among the information processing devices which constitute the communication system 200 in the embodiments of the present technology, an information processing device which serves as a reference (for example, an information processing device which receives a signal) will be referred to as a self-station, and other information processing devices will be referred to as a transmitting station, a receiving station, a transmission source station, a destination station, and a nearby station.

In more detail, an information processing device which transmits a signal received by the self-station will be referred to as a transmitting station, and an information processing device which receives a signal from the self-station will be referred to as a receiving station. In addition, a transmission source information processing device which first transmits a signal received by the self-station (a so-called leader of a bucket brigade) will be referred to as a transmission source station, and an information processing device which receives a signal received by the self-station in the end (a so-called terminus of the bucket brigade) will be referred to as a destination station. In addition, an information processing device which transfers a signal received by the self-station will be referred to as a relay station, and an information processing device which is near or in the vicinity of the self-station on a network will be referred to as a nearby station.

[Configuration Example of an Information Processing Device]

FIG. 2 is a block diagram showing an internal configuration example of the information processing device 100 according to the first embodiment of the present technology. Herein, only the information processing device 100 will be described because internal configurations of the other information processing devices (the information processing devices 210, 220, 230, and 240) are the same as that of the information processing device 100, and thus other information processing devices will not be described.

The information processing device 100 includes an antenna 110, a communication unit 120, an input/output (I/O) interface 130, a control unit 140, and a memory 150. In addition, these units are connected to one another via a bus 160.

The communication unit 120 is a module (for example, a modem) for performing transmission and reception of radio waves via the antenna 110. For example, the communication unit 120 can perform wireless communication through millimeter wave communication (60 GHz, etc.), a wireless local area network (LAN) of 900 MHz, 2.4 GHz, or 5 GHz, or an ultra-wide band (UWB). In addition, the communication unit 120 can perform wireless communication through, for example, visible light communication or near field communication (NFC).

For example, the communication unit 120 exchanges a signal (an RANN, a PREQ, or a PREP) for generating or updating a communication path of multi-hop using wireless communication with another information processing device based on control of the control unit 140. The RANN, PREQ, and PREP will be described in detail with reference to FIG. 4, and the like.

It should be noted that the communication unit 120 may be designed to perform wireless communication using radio waves (electromagnetic waves) or wireless communication using a medium other than radio waves (for example, wireless communication performed using a magnetic field).

In addition, the communication unit 120 performs communication with a nearby information processing device by setting up a communication link, manages the number of nearby information processing devices with which the information processing device 100 can communicate, and retains information which indicates the number of nearby communicable information processing devices (communicable device number information). Furthermore, the communication unit 120 regularly or irregularly observes a degree of use of a channel used in wireless communication, and retains information which indicates a level of congestion of a communication line around the information processing device 100 (congestion level information). In addition, the communication unit 120 observes link quality (reception power, a transmittable data rate, etc.) with a nearby information processing device performing wireless communication therewith, and retains information which indicates a bandwidth which makes wireless communication with a nearby information processing device possible (communication state information). Then, the communication unit 120 supplies the information to the control unit 140.

The I/O interface 130 is an interface with an external device such as a sensor actuator which operates in linkage with the information processing device 100. FIG. 2 shows an example in which, for example, a movement detection unit 171, an operation reception unit 172, a display unit 173, and an audio output unit 174 are connected with the I/O interface 130 as external devices. In addition, FIG. 2 shows the example in which the movement detection unit 171, the operation reception unit 172, the display unit 173, and the audio output unit 174 are provided outside the information processing device 100, but all or some of the units may be installed inside the information processing device 100.

The movement detection unit 171 detects a movement of the information processing device 100 by detecting acceleration, a motion, an inclination, or the like of the information processing device 100, and outputs movement information regarding the detected movement to the control unit 140 via the I/O interface 130. For example, the movement detection unit 171 retains movement information which indicates whether or not the information processing device 100 is moving to a different place (a log (or real-time information regarding the movement)), and supplies the information to the control unit 140. As the movement detection unit 171, for example, an acceleration sensor, a gym sensor, or the Global Positioning System (GPS) can be used. The movement detection unit 171 can compute a movement distance of the information processing device 100 (for example, a movement distance per unit time) using, for example, position information (for example, latitude and longitude) detected using the GPS.

The operation reception unit 172 is an operation reception unit which receives an operation input performed by a user, and outputs operation information according to the received operation input to the control unit 140 via the I/O interface 130. The operation reception unit 172 is realized with, for example, a touch panel, a keyboard, or a mouse.

The display unit 173 is a display unit on which various kinds of information are displayed based on control of the control unit 140. As the display unit 173, for example, a display panel such as an organic electro luminescence (EL) panel, or a liquid crystal display (LCD) can be used. The operation reception unit 172 and the display unit 173 can be configured to be integrated using a touch panel on which operations can be input by a user bringing his or her finger in contact with or close to its display plane.

The audio output unit 174 is an audio output unit (for example, a speaker) which outputs various kinds of sounds based on control of the control unit 140.

The control unit 140 controls each unit of the information processing device 100 based on a control program stored in the memory 150. The control unit 140 performs, for example, signal processing of transmitted and received information. In addition, the control unit 140 is realized with a central processing unit (CPU).

The memory 150 is a memory which stores various kinds of information. For example, the memory 150 stores various kinds of information necessary for the information processing device 100 to perform a desired operation (for example, the control program). In addition, the memory 150 stores, for example, the mesh path table 350 shown in FIG. 21. Furthermore, the memory 150 stores various kinds of content such as music content and image content (for example, dynamic image content and still image content).

When data is transmitted using wireless communication, for example, the control unit 140 processes information read from the memory 150, a signal input from the I/O interface 130, or the like, and generates a mass of data to be actually transmitted (transmission packets). Successively, the control unit 140 outputs the generated transmission packets to the communication unit 120. In addition, the communication unit 120 converts the transmission packets in a format of a communication scheme for actual transfer or the like, and transmits the converted transmission packets to the outside from the antenna 110.

In addition, when data is received using wireless communication, for example, the communication unit 120 extracts reception packets of radio waves received via the antenna 110 through signal processing performed by a receiver inside the communication unit 120. Then, the control unit 140 analyzes the extracted reception packets. When the packets are determined to be data to be retained as a result of the analysis, the control unit 140 writes the data in the memory 150. In addition, when the packets are determined to be data to be transferred to another information processing device, the control unit 140 outputs the data to the communication unit 120 as transmission packets to be transmitted to another information processing device. Furthermore, when the packets are determined to be data to be transferred to an external actuator, the control unit 140 outputs the packets to the outside (for example, the display unit 173) from the I/O interface 130.

The control unit 140 can, for example, provide various kinds of content stored in the memory 150 to another information processing device using wireless communication.

It should be noted that, when the information processing device 100 is driven by a battery, a battery is mounted (installed or loaded) in the information processing device 100. In this case, the control unit 140 has a function of estimating a remaining battery amount, and thus can acquire the estimated remaining battery amount as needed.

[Example of a Signal Format]

FIG. 3 is a diagram showing an example of a signal format of a packet exchanged between information processing devices which constitute the communication system 200 according to the first embodiment of the present technology.

Here, each of the information processing devices constituting the communication system 200 exchanges signals in a packet form during communication. The signal in the packet form includes at least two types including a management packet and a data packet. Thus, a of FIG. 3 shows an example of the signal format of a management packet and b of FIG. 3 shows the signal format of a data packet.

The management packet shown in a of FIG. 3 is a packet used for generating and retaining a network.

As shown in a of FIG. 3, the transmission signal of the management packet is composed of a header part (301 to 303) and a payload part 304. In addition, there are three fields in the header part. These three fields are a Frame Control field 301, an RX STA ADDR field 302, and a TX STA ADDR field 303.

In the leading part of the header part, there is the Frame Control field 301 in which an attribute of a signal including this header and the like are stored. Each information processing device can acquire information of whether a packet is a data packet or a management packet for control and management and the like with reference to the Frame Control field 301.

In the RX STA ADDR field 302, an identifier (address) indicating a packet receiving station is stored. Each information processing device can know which information processing device is supposed to receive the signal (packet) with reference to the RX STA ADDR field 302. An information processing device which has received the signal (packet) starts a reception process of the received signal (packet) when, for example, content of the RX STA ADDR field 302 is its own identifier (address) or a broadcast address.

In the TX STA ADDR field 303, an identifier (address) of a packet transmitting station. Each information processing device can recognize which information processing device has transmitted the signal with reference to the TX STA ADDR field 303.

The data packet shown in b of FIG. 3 is a packet used when application data or the like is transmitted.

As shown in b of FIG. 3, the transmission signal of the data packet is composed of a header part (305 to 309) and a payload part 310. In addition, there are 5 fields in the header part. These 5 fields are a Frame Control field 305, an RX STA ADDR field 306, a TX STA ADDR field 307, a Dst STA ADDR field 308, and an Src STA ADDR field 309.

In the leading part of the header part, there is the Frame Control field 305 in which an attribute of a signal including this header and the like are stored. Each information processing device can acquire information of whether a packet is a data packet or a management packet for control and management and the like with reference to the Frame Control field 305.

In the RX STA ADDR field 306, an identifier (address) indicating a packet receiving station is stored. Each information processing device can know which information processing device is supposed to receive the signal (packet) with reference to the RX STA ADDR field 306. An information processing device which has received the signal (packet) starts a reception process of the received signal (packet) when, for example, content of the RX STA ADDR field 306 is its own identifier (address) or a broadcast address.

In the TX STA ADDR field 307, an identifier (address) of a packet transmitting station. Each information processing device can recognize which information processing device has transmitted the signal with reference to the TX STA ADDR field 307.

In the Dst STA ADDR field 308, an identifier (address) indicating a packet destination station (an information processing device which is supposed to receive the packet in the end) is stored. Each information processing device can know to which information processing device the signal is supposed to be transmitted in the end with reference to the Dst STA ADDR field 308. An information processing device which has received the signal performs a transfer process to transmit the received signal to a destination station when, for example, the Dst STA ADDR field 308 does not include its own identifier (address).

In the Src STA ADDR field 309, an identifier (address) of a packet transmission source station (an information processing device which first transmitted the packet first) is stored. For example, each information processing device can recognize which information processing device has transmitted the signal with reference to the Src STA ADDR field 309.

Here, when data destined for a specific information processing device is transferred through the above-described multi-hop relay, it is necessary to decide a path on which the data is to be relayed before the data is transferred. This procedure is called path selection. In addition, in this path selection, a communication path is decided by exchanging a management signal between information processing devices for selecting a path. It should be noted that a communication path on a mesh network is called a mesh path. In FIGS. 4 to 7, types and formats of management signals used for generating this mesh path are shown.

[Examples of Signal Formats]

FIG. 4 is a diagram showing an example of a signal format of a management packet exchanged between the information processing devices which constitute the communication system 200 according to the first embodiment of the present technology.

FIGS. 5 to 7 are diagrams showing examples of the content of the signal formats of the management packet exchanged between the information processing devices which constitute the communication system 200 according to the first embodiment of the present technology. In other words, FIGS. 5 to 7 show the examples of the content of the signal formats of the management packets shown in FIG. 4.

a of FIG. 4 shows the management packet. This management packet is the same as that of a of FIG. 3. As described above, the Frame Control field 301 of the management packet stores the fact that the signal is a management packet.

b to d of FIG. 4 show a configuration example of the payload part 304 of the management packet shown in a of FIG. 4. Specifically, b of FIG. 4 shows a configuration example of a case in which the management packet is an RANN (root announcement signal). In addition, c of FIG. 4 shows a configuration example of a case in which the management packet is a PREQ (path request signal). Also, d of FIG. 4 shows a configuration example of a case in which the management packet is a PREP (path reply signal).

The RANN (root announcement signal) shown in b of FIG. 4 is a signal used for proactively generating a mesh path regardless of presence of transmission data. Here, the case in which a mesh path is proactively generated is a case in which, regardless of necessity of data transfer, a mesh path between a specific information processing device and another information processing device on a network is generated beforehand.

As shown in b of FIG. 4, there are a plurality of fields (311 to 318) in the RANN.

In the Length field 311, information indicating the length of the payload is stored.

In the ActionType field 312, an identifier indicating that the signal is an RANN is stored. An information processing device which has received the signal can recognize that the received signal is an RANN with reference to the ActionType field 312.

In the Flags field 313, an attribute of a transmission source station of the RANN (information processing device which has transmitted the RANN first) is stored. This attribute is information indicating, for example, a role of the information processing device. For example, when the information processing device which has transmitted the RANN first (transmission source station) is a device for causing another information processing device to be connected to the Internet, the Flags field 313 stores that fact.

In the OrigSTA field 314, an identifier (address) indicating which information processing device is the transmission source station of the RANN (information processing device which has transmitted the RANN first) is stored. Here, although the RANN is transferred to a remote spot through multi-hop relay, an information processing device which has received the RANN can recognize which information processing device is the transmission source station of the received RANN with reference to OrigSTA field 314.

In the SeqNum field 315, an identifier for identifying the RANN is stored. For example, each time the RANN is transmitted from the transmission source station, an incremented value is stored in the SeqNum field 315. In other words, as the RANN is regularly or irregularly transmitted from the transmission source station, an information processing device which has received the RANN can recognize whether or not the received RANN is the same RANN as that received before with reference to the SeqNum field 315.

In the HopCount field 316, a numerical value indicating the number of hops necessary for the RANN to be delivered from the transmission source station (information processing device which has transmitted the RANN first) is stored. An information processing device which has received the RANN transfers the received RANN in multi-hop, and an incremented value is stored in the HopCount field 316 with each the transfer process.

In the Metric field 317, a value indicating a metric value that was necessary for arrival of the RANN from the transmission source station (information processing device which has transmitted the RANN first) is stored. An information processing device which has received the RANN transfers the received RANN in multi-hop, and the Metric field 317 stores a value obtained by cumulatively adding metric values of a link between information processing devices with each transfer process.

Here, a metric value of a link between information processing devices is a value indicating, for example, at how many Mbps transfer is possible on that link. In the IEEE standard 802.11-2012, for example, a metric value ca can be obtained from the following expression 1.

$$ca = [O + (Bt/r)] / [1/(1-ef)] \qquad \text{Expression 1}$$

Here, r is a value indicating a data rate (Mb/s). In addition, ef is a value indicating a frame error rate. Further, Bt is a value indicating a frame size. Also, O is an intrinsic value of a physical layer (PHY).

In the Etc field 318, other management information is stored.

The PREQ (path request signal) shown in c of FIG. 4 is a signal used for requesting generation of a mesh path destined for a specific information processing device.

As shown in c of FIG. 4, there are a plurality of fields (319 to 328) in the PREQ.

In the Length field 319, information indicating the length of the payload is stored.

In the ActionType field 320, an identifier indicating that the signal is a PREQ is stored. An information processing device which has received the signal can recognize that the received signal is a PREQ with reference to the ActionType field 320.

In the Flags field 321, information indicating whether the PREQ has been transmitted triggered by reception of the RANN (whether this is a proactive mesh path generation process) is stored.

In the OrigSTA field 322, an identifier (address) indicating an information processing device serving as a requesting source of mesh path generation (transmission source station) is stored. Here, although the PREQ is transferred to a remote spot through multi-hop relay, an information processing device which has received the PREQ can recognize which information processing device is the transmission source station of the received PREQ with reference to the OrigSTA field 322.

In the DestSTA field 323, an identifier indicating an information processing device serving as a request destination of mesh path generation (destination station) is stored. When an information processing device specified with the identifier stored in the DestSTA field 323 (destination station) receives the PREQ, the device replies with a PREP in response thereto. Accordingly, a bidirectional mesh path is generated.

In the SeqNum field 324, an identifier for identifying the PREQ is stored. For example, each time the PREQ is transmitted from the transmission source station, an incremented value is stored in the SeqNum field 324. In other words, there are cases in which, although the PREQ is transmitted from the transmission source station a plurality of times, an information processing device which has received the PREQ can recognize whether or not the received PREQ is the same one as a PREQ received before with reference to the SeqNum field 324.

In the HopCount field 325, a numerical value indicating the number of hops necessary for the PREQ to be delivered from the transmission source station (information processing device which has transmitted the PREQ first) is stored. An information processing device which has received the PREQ transfers the received PREQ in multi-hop, and an incremented value is stored in the HopCount field 325 with each the transfer process.

In the Metric field 326, a value indicating a metric value that was necessary for arrival of the PREQ from the transmission source station (information processing device which has transmitted the PREQ first) is stored. An information processing device which has received the PREQ transfers the received PREQ in multi-hop, and the Metric field 326 stores a value obtained by cumulatively adding metric values of a link between information processing devices with each transfer process.

In the Lifetime field 327, information indicating a lifetime of a mesh path is stored. In other words, when a mesh path generation request succeeds, a valid mesh path (active mesh path) is generated, and a value for specifying the lifetime of the mesh path is stored in the Lifetime field 327.

In the Etc field 328, other management information is stored.

The PREP (path reply signal) shown in d of FIG. 4 is a signal used for reply to a request to generate a mesh path destined for a specific information processing device.

As shown in d of FIG. 4, there are a plurality of fields (329 to 338) in the PREP.

In the Length field 329, information indicating the length of the payload is stored.

In the ActionType field 330, an identifier indicating that the signal is a PREP is stored. An information processing device which has received the signal can recognize that the received signal is a PREP with reference to the ActionType field 330.

In the Flags field 331, an attribute of a transmission source station of the PREP (an information processing device which has transmitted the PREP first) is stored.

In the OrigSTA field 332, an identifier indicating an information processing device serving as a requesting source for generating a mesh path is stored. Here, the identifier of the information processing device stored in the OrigSTA field 322 of the PREQ (transmission source station of the PREQ) is transcribed in the OrigSTA field 332.

In the DestSTA field 333, an identifier indicating an information processing device serving as a request destination for generation of the mesh path is stored. Here, the identifier of the information processing device stored in the DestSTA field 323 of the PREQ (destination station of the PREQ) is transcribed in the DestSTA field 333.

In the SeqNum field 334, an identifier for identifying the PREP is stored. For example, each time the PREP is transmitted from the transmission source station, an incremented value is stored in the SeqNum field 334. In other words, there are cases in which, although the PREP is transmitted from the transmission source station a plurality of times, a destination station which has received the PREP can recognize whether or not the received PREP is the same one as a PREP received before with reference to the SeqNum field 334.

In the HopCount field 335, a numerical value indicating the number of hops necessary for the PREP to be delivered from the transmission source station of the PREP is stored. An information processing device which has received the PREP transfers the received PREP in multiple-hop, and an incremented value is stored in the HopCount field 335 with each transfer process.

In the Metric field 336, a value indicating a metric value that was necessary for arrival of the PREP from the transmission source station is stored. An information processing device which has received the PREP transfers the received PREP in multi-hop, and the Metric field 336 stores a value obtained by cumulatively adding metric values of a link between information processing devices with each transfer process.

In the Lifetime field 337, information indicating a lifetime of a mesh path is stored. In other words, when a mesh path generation request succeeds, a valid mesh path (active mesh path) is generated, and a value for designating the lifetime of the mesh path is stored in the Lifetime field 337.

In the Etc field 338, other management information is stored.

The information processing devices constituting the communication system 200 generate path information (also referred to as transfer information or mesh path information) necessary during multi-hop communication by exchanging the RANN, the PREQ, and the PREP. For example, the information processing devices generates a multi-hop communication path at a fixed time interval or irregularly by exchanging the RANN, the PREQ, and the PREP. In addition, the path information is path information for specifying the next information processing device to which packets should be transferred in order to deliver the packets to a destination information processing device. This path information is retained inside each information processing device as a mesh path table. In addition, when transmitting data packets to a specific information processing device, each information processing device decides an information processing device to be designated as a receiving station to transmit the packets with reference to the mesh path table. In other words, when transmitting data packets to a specific information processing device, each information processing device decides what information processing device should be designated in the RX STA ADDR field 302 to transmit the packets with reference to the mesh path table. This mesh path table will be described in detail with reference to FIGS. 8, 21, and 22.

[Configuration Example of a Mesh Path Table]

FIG. 8 is a diagram schematically showing an example of a mesh path table (mesh path table 340) retained by each information processing device which constitutes the communication system 200 according to the first embodiment of the present technology.

a of FIG. 8 schematically shows a configuration of the mesh path table 340, and b of FIG. 8 shows an example of the content of the mesh path table 340. Specifically, b of FIG. 8 shows an Index 346, a data name 347, and a meaning 348 as the example of the content of the mesh path table 340.

As shown in a of FIG. 8, the mesh path table 340 is recorded in the memory 150 in a record form. In addition, the mesh path table 340 is designed such that each record can be extracted therefrom using the address (Dest 341) of a destination station as a key. In addition, as records of the mesh path table 340, a NextHop 342, a Metric 343, a SeqNum 344, and an ExpTime 345 are stored. It should be noted that, in b of FIG. 8, reference symbols a to d for identifying each of the records are given in the Index 346.

In the NextHop 342 of "a" of the Index 346, an identifier of an information processing device indicating to what information processing device data should be transferred next in order to deliver the data to a destination station is stored. In other words, the NextHop 342 stores an identifier of a transmitting station.

In the Metric 343 of "b" of the Index 346, a path metric value from a self-station to the destination station of the mesh path is stored. A computation method for this path metric value will be shown in FIGS. 9, 10, etc.

In the SeqNum 344 of "c" of the Index 346, the value of SeqNum of the PREQ or the PREP (for example, the SeqNum fields 324 and 334 shown in c and d of FIG. 4) used to generate the mesh path is stored.

In the ExpTime 345 of "d" of the Index 346, the expiration time of the mesh path is stored. The expiration time of the mesh path is decided based on the Lifetime fields 327 and 337 of the PREQ or the PREP (shown in c and d of FIG. 4) used to generate the mesh path.

Each information processing device constituting the communication system 200 generates path information at the time of a request of generation of a path or a reply thereto, and writes the generated path information in the mesh path table 340. In addition, when transferring data, based on the address (Dest 341) of a destination station to which the data is to be delivered, each information processing device constituting the communication system 200 extracts a record corresponding to the destination station from the mesh path table 340. In addition, the information processing device performs a transfer process for transferring the data to a transmitting station corresponding to the Next-op 342 of the extracted record.

[Generation Example of a Reactive Mesh Path]

FIGS. 9 and 10 are diagrams showing a generation example of a reactive mesh path retained by each information processing device constituting the communication system 200 according to the first embodiment of the present technology.

In FIGS. 9 and 10, the procedure for generating the mesh path table 340 using a PREQ and a PREP will be described. Specifically, in FIGS. 9 and 10, a case in which, when the information processing device 100 attempts to transmit data destined for the information processing device 240 in the topology shown in FIG. 1, the information processing device 100 requests generation of a mesh path between the information processing device 240 will be described.

As shown in a of FIG. 9, the information processing device 100 transmits a PREQ in which the information processing device 240 has been designated in the Dest STA field 323 (shown in c of FIG. 4). A configuration of the PREQ has been shown in c of FIG. 4 and FIG. 6. In addition, when the PREQ is transmitted, the control unit 140 of the information processing device 100 stores zero as an initial value in the HopCount field 325 and the Metric field 326 of the PREQ to be transmitted. Furthermore, the control unit 140 of the information processing device 100 stores a value obtained by incrementing the value stored in the PREQ that was transmitted the previous time in the SeqNum field 324 of the PREQ to be transmitted. In addition, the control unit 140 of the information processing device 100 sets a broadcast address for designating each information processing device located nearby as a receiving station in the RX STA ADDR field 303 (shown in a of FIG. 4) of the management packet of the PREQ to be transmitted.

It should be noted that, in a of FIG. 9, the flow of the PREQ transmitted from the information processing device 100 to each information processing device is schematically shown with thick-line arrows. In addition, the name of the signal (PREQ), the reference symbol of the destination station (Dest-E), and the reference symbol of the transmission source station and relay station (including the transmitting station) of the PREQ (A) are given to the thick-line arrows.

For example, PREQ Dest=E(A) shown in a of FIG. 9 means that it is a PREQ of which the destination station is the information processing device 240 and the transmission source station and the relay station (including the transmitting station) are the information processing device 100. It should be noted that the same applies to the names and reference symbols of thick-line arrows in the following drawings.

As shown in a of FIG. 9, the information processing devices 210, 220, and 230 receive the PREQ transmitted from the information processing device 100. Upon receiving the PREQ, the information processing devices 210, 220, and 230 generate mesh path information destined for an information processing device (destined for the information processing device 100) of which the identifier is stored in the OrigSTA field 322 of the received PREQ. In addition, the information processing devices 210, 220, and 230 records the generated mesh path information in the mesh path table 340 as mesh path information destined for the information processing device 100.

In this case, each information processing device stores the identifier (address) of the information processing device 100 in the Dest 341 of the mesh path table 340. In addition, each information processing device stores the identifier (address) of the TX STA ADDR field 303 of the received PREQ in the NextHop 342 of "a" of the Index 346 of the mesh path table 340.

Furthermore, each of the information processing devices acquires a metric value of a link between a transmitting station of the received PREQ and the self-device. For example, the information processing device 210 acquires a metric value of a link between the transmitting station (the information processing device 100) of the received PREQ and the self-device (the information processing device 210). Subsequently, each information processing device computes a path metric value by adding the acquired metric value of the link to the value stored in the Metric field 326 of the received PREQ. Then, each information processing device stores the computed path metric value in the Metric 343 of "b" of the Index 346 of the mesh path table 340.

Here, the transmitting station of the received PREQ is the information processing device corresponding to the identifier stored in the TX STA ADDR field 303, and is the information processing device 100 in the example shown in FIG. 9. In addition, the metric value of the link between the transmitting station of the received PREQ and the self-device is, for example, a value which indicates at how many Mbps transfer is possible on that link.

Furthermore, each information processing device stores the value of the SeqNum field 324 of the received PREQ in the SeqNum 344 of "c" of the Index 346 of the mesh path table 340.

In addition, each information processing device stores the value obtained by adding the value stored in the Lifetime field 327 of the PREQ to the reception time of the PREQ (expiration time) in the ExpTime 345 of "d" of the Index 346 of the mesh path table 340. The mesh path generated in that manner is referred to as a value mesh path until the expiration time stored in the ExpTime 345 of "d" of the Index 346 of the mesh path table 340.

In this manner, the information processing devices 210, 220, and 230 generate the mesh path destined for the information processing device 100.

Furthermore, as shown in b of FIG. 9, the respective information processing devices 210, 220, and 230 which have received the PREQ transfer the received PREQ because the identifier of the DestSTA field 323 of the received PREQ is not theirs. At the time of this transfer, the information processing devices 210, 220, and 230 increment the value of the HopCount field 325 of the received PREQ. Then, the previously calculated path metric value is stored in the Metric field 326, and the value of the received PREQ is transcribed in the field of another PREQ. In addition, the information processing devices 210, 220, and 230 set a broadcast address for designating each information processing device located nearby as a receiving station in the RX STA ADDR field 302.

Upon receiving the transferred PREQ, for example, the information processing device 240 generates mesh path information destined for the information processing device (destined for the information processing device 100) of which the identifier is stored in the OrigSTA field 322 of the received PREQ in the above-described procedure. Then, the information processing device 240 records the generated mesh path information in the mesh path table 340 as mesh path information of which the recipient is set to the information processing device 100.

Here, as shown in b of FIG. 9, the information processing device 240 receives such PREQ signals from the information processing devices 220 and 230. When the PREQ signal has received from a plurality of information processing devices in this manner, the information processing device 240 selects a path having a low path metric value as a valid mesh path, and discards a PREQ having a high path metric value.

In the example shown in FIG. 9, a case in which the path metric value of the PREQ transferred from the information processing device 230 is lower than the path metric value of the PREQ transferred from the information processing device 220 is assumed. In this case, the information processing device 240 generates a mesh path of which the NextHop 342 is set to the information processing device 230 as a mesh path designed for the information processing device 100.

In addition, since the information processing device 240 designates self-device as the DestSTA field 323 of the received PREQ, the device generates a PREP for replying to this PREQ. Thus, as shown in a of FIG. 10, the information processing device 240 transmits the generated PREP signal by designating the NextHop destined for the OrigSTA field 322 of the PREQ as a receiving station.

In this case, the information processing device 240 transcribes the values stored in the PREQ in the OrigSTA field 332 and the DestSTA field 333, and stores zero as an initial value in the HopCount field 335 and the Metric field 336. In addition, the information processing device 240 stores in the SeqNum 344 the value obtained by incrementing the value stored in the previously transmitted PREQ or PREP. In addition, the information processing device 240 sets the NextHop destined for OrigSTA of the PREQ (the information processing device 230 in this case) in the RX STA ADDR field 302 for transmission to the information processing device 230 in unicast.

Upon receiving the PREP transmitted from the information processing device 240, the information processing device 230 generates mesh path information destined for an information processing device (destined for the information processing device 240) of which the identifier is stored in the DestSTA field 333 of the received PREP in the above-described procedure. Then, the information processing device 230 records the generated mesh path information in the mesh path table 340 as mesh path information of which the destination is set to the information processing device 240. In this manner, upon receiving the PREP transmitted from the information processing device 240, the information processing device 230 generates a mesh path destined for the information processing device 240.

As shown in b of FIG. 10, the identifier of the OrigSTA field 332 of the received PREP is not of the information processing device 230 which has received the PREP. For this reason, the information processing device 230 transfers the received PREP to the information processing device which corresponds to the identifier of the OrigSTA field 332 of the received PREP. At the time of this transfer, the information processing device 230 increments the value of the HopCount field 335 of the received PREP. Then, a path metric value calculated in the above-described procedure is stored in the Metric field 336, and the value of the received PREP is transcribed in the field of another PREP. In addition, in order to transmit the PREP in unicast, the information processing device 230 sets the address of the NextHop 342 of the mesh path destined for the information processing device 100 (the address of the information processing device 100) in the RX STA ADDR field 302. Accordingly, unicast transmission of the PREP from the information processing device 230 to the information processing device 100 is performed as shown in b of FIG. 10.

Upon receiving the PREP transmitted from the information processing device 230, the information processing device 100 generates mesh path information destined for the information processing device of which the identifier is stored in the DestSTA field 333 of the received PREP (destined for the information processing device 240) in the above-described procedure. Then, the information processing device 100 records the generated mesh path information in the mesh path table 350 as mesh path information of which the destination is set to the information processing device 240.

In this manner, the information processing device 100 generates a mesh path destined for the information processing device 240. In addition, since the identifier of the OrigSTA field 332 of the received PREP is of the information processing device 100, the device finishes the bi-directional mesh path generation procedure between the information processing device 100 and the information processing device 240 without performing a successive transfer process.

Thereafter, the mesh path records generated and retained in each of the information processing devices can be referred to before the expiration time (ExpTime 345) of the generated mesh path elapses. For this reason, before the expiration time elapses, when data is exchanged between the information processing device 100 and the information processing device 240, the mesh path records retained in each of the information processing devices can be referred to perform communication in multi-hop relay.

[Generation Example of a Proactive Mesh Path]

As described above, generation of a reactive mesh path is started when actual transfer of data is necessary. However, regardless of necessity of data transfer, there is a technique of generating a mesh path in advance between a specific information processing device and another information processing device on a network. This technique is called proactive mesh path generation. When, for example, there is a gateway connected to an external network on a mesh network and a device is connected to the Internet from the gateway, it is convenient to create a mesh path between an information processing device functioning as a gateway in advance. For this reason, there are cases in which a proactive mesh path is generated. Thus, in FIGS. 11 to 13, an example of generating a proactive mesh path will be described.

FIGS. 11 to 13 are diagrams showing the example of generation of a proactive mesh path by the information processing devices which constitute the communication system 200 according to the first embodiment of the present technology. In FIGS. 11 and 13, an example in which the information processing device 100 has a gateway function and the information processing device 100 operates as a root station of a path is shown.

As shown in a of FIG. 11, in generation of a proactive mesh path, the information processing device 100 operating as a root station of a path regularly or irregularly transmits an RANN (root announcement signal) in broadcast. In other words, for transmission of an RANN, the address of broadcast is stored in the RX STA ADDR field 302.

In addition, as shown in b and c of FIG. 4, the RANN is substantially the same as the PREQ except for the fact that it does not have a DestSTA field and a Lifetime field.

Furthermore, each process performed by each information processing device which has received the RANN is substantially the same as when the PREQ is received. In other words, each information processing device which has received the RANN updates the HopCount field 316 and the Metric field 317 of the received RANN. Then, the updated RANN is transferred toward information processing devices located nearby in broadcast as shown in b of FIG. 11.

Here, since the RANN is transmitted toward information processing devices located nearby in broadcasting, each information processing device may receive the RANN from different information processing devices a plurality of times. In such a case, a path metric value is computed with each reception of the RANN, and each process is performed using only an RANN having a low path metric value as a valid RANN. The information processing device (nearby information processing device) from which the RANN having the lowest path metric value has been transmitted is ascertained, and the information processing device which has transmitted the RANN with the minimum value is recorded.

Each information processing device which has received the RANN transmits a PREQ to generate a mesh path between the information processing device of which the identifier is stored in the OrigSTA field 314 of the RANN. In other words, each information processing device which has received the RANN transmits a PREQ which stores the identifier of the OrigSTA field 314 of the RANN in the DestSTA field 323.

Here, each information processing device has already ascertained via which information processing device (nearby information processing device) a signal should be transmitted to the information processing device of which the identifier is stored in the OrigSTA field 314 of the received RANN to minimize a path metric value. When the RANN is used together to this end, an information processing device (nearby information processing device) having the minimum path metric value is set as a receiving station and the PREQ is transmitted in unicast, rather than in broadcast. In this case, in the Flags field 321 of the PREQ, the fact that it is the PREQ transmitted due to the reception of the RANN is stored. In addition, a of FIG. 12 shows an example in which the information processing device 240 transmits the PREQ designating the information processing device 230 as a receiving station. Since each process regarding the PREQ other than the above is the same as in the generation of the reactive mesh path, description will be omitted here.

In addition, as shown in b of FIG. 12, upon receiving the PREQ from the information processing device 240, the information processing device 230 updates the mesh path destined for the information processing device 240, and further transfers the PREQ to the information processing device 100.

Furthermore, as shown in a of FIG. 13, upon receiving the PREQ from the information processing device 230, the information processing device 100 updates the mesh path destined for the information processing device 240, and replies with a PREP in response to the received PREQ.

In addition, as shown b of in FIG. 13, upon receiving the PREP from the information processing device 100, the information processing device 230 updates the mesh path destined for the information processing device 100, and further transfers the PREP to the information processing device 240.

Upon receiving the PREP from the information processing device 230, the information processing device 240 updates the mesh path destined for the information processing device 100, and finishes the bi-directional mesh path generation procedure between the information processing device 240 and the information processing device 100.

It should be noted that, as a technology for configuring such a wireless network system described above, the IEEE standard 802.11-2012 (IEEE Standard for Information Technology—Telecommunications and information exchange between systems—Local and metropolitan area networks—Specific requirements Part 11: Wireless LAN Medium Access Control (MAC) and Physical Layer (PHY) Specifications) is widely known.

[Regarding Generation and Maintenance Management of a Mesh Path]

As described above, each of the information processing devices which constitute the communication system 200 exchanges signals (PREQ, PREP, and RANN) to generate and perform maintenance management of a mesh path. Thus, it is important to more appropriately perform generation and maintenance management of a mesh path by making a change or addition to each of the processes. This point will be described below.

Here, the case in which respective information processing devices are placed and links (indicated by the dotted lines 251 to 257) are stretched as shown in FIG. 1 is assumed. In this case, a metric value of the first link (indicated by the dotted line 251) is assumed to be 100, a metric value of the second link (indicated by the dotted line 252) to be 100, and a metric value of the third link (indicated by the dotted line 253) to be 400. In addition, a metric value of the fourth link (indicated by the dotted line 254) is assumed to be 150, and a metric value of the fifth link (indicated by the dotted line 255) is assumed to be 400. Further, a metric value of the sixth link (indicated by the dotted line 256) is assumed to be 100, and a metric value of the seventh link (indicated by the dotted line 257) is assumed to be 200.

[Regarding Generation of a Reactive Mesh Path]

FIGS. 14 and 15 are diagrams showing an example of generation of a reactive mesh path by each of the information processing devices which constitute the communication system 200 according to the first embodiment of the present technology. In FIGS. 14 and 15, a case in which the information processing device 100 requests the information processing device 220 to generate a mesh path is shown.

As shown in a of FIG. 14, the information processing device 100 transmits a PREQ in which the information processing device 220 is designated in the DestSTA field 323 in broadcast. This PREQ is directly transmitted to the information processing device 220. Thus, upon receiving the PREQ, the information processing device 220 starts a response process with a PREP as shown in b of FIG. 14. Accordingly, generation of a mesh path between the information processing device 100 and the information processing device 220 is completed.

After a mesh path is generated between the information processing device 100 and the information processing device 220, when the information processing device 210 transfers the received PREQ, the information processing device 220 receives the PREQ as shown in a of FIG. 15.

Here, the metric value of the path passing through the information processing device 210 (200 (=100+100)) is smaller than the metric value of the link (400) between the information processing device 100 and the information processing device 220. For this reason, when upon receiving the PREQ transmitted by the information processing device 210, the information processing device 220 starts the response process with the PREP again as shown in b of FIG. 15. Then, as the information processing device 210 transfers the PREP to the information processing device 100, the path between the information processing device 100 and the information processing device 220 passing through the information processing device 210 (a path with a minimum metric value) can be set.

Before a path with a minimum metric value is set, however a wrong path (a path of which the metric value is not minimum) may be set as shown in FIG. 14.

Thus, an example for preventing a wrong path from being set will be shown in the embodiment of the present technology. For example, an example in which a destination station of a PREQ sets a timer (time window) immediately after receiving the PREQ without replying with a PREP, and starts the response process with the PREP at the timing at which the timer ends will be shown in the first embodiment of the present technology.

[Regarding Generation of a Reactive Mesh Path]

Figure 16:
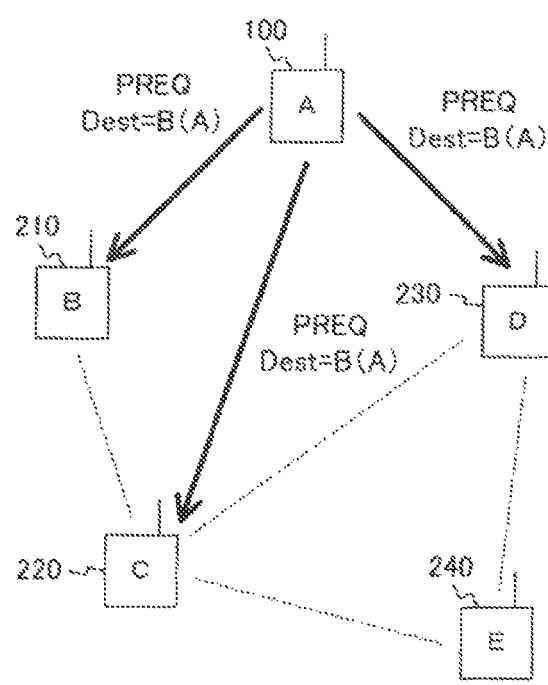
FIG. 16 is a diagram showing a generation example of a reactive mesh path retained by each of the information processing devices which constitute the communication system 200 according to the first embodiment of the present technology.

FIG. 16 is a diagram showing an example of generation of a reactive mesh path by each of the information processing devices which constitute the communication system 200 according to the first embodiment of the present technology. In FIG. 16, a case in which the information processing device 100 requests the information processing device 210 to generate a mesh path is shown.

As shown in FIGS. 14 and 15, the case in which the path between the information processing device 100 and the information processing device 220 passing through the information processing device 210 (path with the minimum metric value) is set is assumed. A case in which the information processing device 100 requests the information processing device 210 to set a new mesh path in that state is assumed.

As shown in FIG. 16, the information processing device 100 transmits a PREQ in which the information processing device 210 is designated in the DestSTA field 323 in broadcast. This PREQ is also directly transmitted to the information processing device 220. For this reason, upon receiving the PREQ, the information processing device 220 starts a reception process of the PREQ. In other words, the information processing device 220 generates (updates in this case) mesh path information destined for the information processing device 100 corresponding to the OrigSTA field 322 of the PREQ, and records the information in the mesh path table 340 as information to be recorded with regard to the information processing device 100.

With these processes, set path information (the path between the information processing device 100 and the information processing device 220 passing through the information processing device 210 (path with the minimum metric value)) is overwritten. In the case of overwriting as above, there is concern of the information processing device 220 not being capable of communicating on the correct path (path with the minimum metric value).

Thus, in the first embodiment of the present technology, an example in which a record of a mesh path is retained as retained information without being re-written when a PREQ is received, and the retained information is reflected as information of the mesh path at the timing at which a PREP is transmitted will be shown.

[Regarding Generation of a Proactive Mesh Path]

FIGS. 17 and 18 are diagrams showing an example of generation of a proactive mesh path by each of the information processing devices which constitute the communication system 200 according to the first embodiment of the present technology. In FIGS. 17 and 18, a case in which the information processing device 100 is a root station and regularly transmits an RANN will be shown.

As shown in a of FIG. 17, the information processing device 100 transmits an RANN in broadcast. This RANN is directly transmitted to the information processing device 220. Thus, upon receiving the RANN, the information processing device 220 starts a transmission process of a PREQ to generate a proactive mesh path as shown in b of FIG. 17. When the information processing device 100 transmits a PREP to the information processing device 220 in response thereto, generation of a mesh path between the information processing device 100 and the information processing device 220 is completed.

Even after the mesh path is generated as above, the information processing device 210 transfers the RANN as shown in a of FIG. 18. Upon receiving the RANN transferred by the information processing device 210 as above, the information processing device 220 starts the transmission process of the PREQ again as shown in b of FIG. 18 because the path passing through the information processing device 210 has a lower metric value.

With these processes, the path between the information processing device 100 and the information processing device 220 passing through the information processing device 210 (path with the minimum metric value) can be set. In generation of the proactive mesh path, however, a wrong path (path of which the metric value is not minimum) may be set before the path with the minimum metric value is set as shown in FIG. 17.

Thus, an example for preventing a wrong path from being set will be shown in the embodiment of the present technology. For example, an example in which a timer (time window) is set immediately after an RANN is received without transmitting a PREQ, and the response process of the PREQ is started at the timing at which the timer ends will be shown in the first embodiment of the present technology.

[Regarding Updating of a Valid Mesh Path]

Herein, a case in which a valid mesh path of the path between the information processing device 100 and the information processing device 220 passing through the information processing device 210 (path with the minimum metric value) is set is assumed.

As described above, an expiration time is set for a mesh path. However, when transmission and reception of data packets are being actively performed while the expiration time approaches, a process of refreshing the mesh path before the mesh path becomes invalid may be performed. This refreshing process is realized by, for example, performing a process such as generating a PREQ with respect to a destination station of a record of which the expiration time has been determined to be approaching. Specifically, for example, an information processing device refers to a record of the mesh path table 340 during transfer of data packets and determines whether or not the expiration time stored in the ExpTime 345 is approaching. Then, when the expiration time is determined to be approaching, the information processing device performs a process such as generating a PREQ to the destination station of the record.

Here, a set value of the ExpTime 345 is set based on values of the Lifetime field 327 and 337 of the PREQ and a PREP thereto. Thus, it is assumed that a start for refreshing the mesh path (a generation process of the PREQ) simultaneously occurs in the information processing device 100, the information processing device 210, and the information processing device 220. When the start for refreshing the mesh path (the generation process of the PREQ) simultaneously occurs, a number of management signals for generating the mesh path are exchanged, which increases overhead of wireless communication.

Thus, an example in which unnecessary overhead is cut will be shown in the embodiment of the present technology.

For example, an example in which a condition for triggering a refreshing process for a mesh path of which the expiration time is approaching is changed according to a position of an information processing device which performs the refreshing process on the mesh path will be shown.

[Regarding Overhead Caused by Generation of Mesh Paths that Partially Overlap]

Herein, the case in which the mesh path of the path between the information processing device 100 and the information processing device 220 passing through the information processing device 210 (the path with the minimum metric value) is assumed. There is a case in which, after the mesh path is generated as above, the information processing device 100 generates another mesh path with the information processing device 210.

Here, in order for the information processing device 100 to generate a mesh path with the information processing device 210, it is necessary for the information processing device 100 to transmit a PREQ in which the information processing device 210 is set in the DestSTA field 323. In this manner, in order for the information processing device 100 to generate a mesh path with the information processing device 210, exchange of management signals for generating the mesh path occurs. It is important to suppress overhead of the management signals to as low a level as possible.

In addition, for the mesh path set between the information processing device 220 by the information processing device 100, the NextHop 342 of the information processing device 100 is set to the information processing device 210. Thus, it is obvious that the NextHop 342 of the information processing device 100 destined for the information processing device 210 is set to the information processing device 210. Even in such case, however, it is necessary for the information processing device 100 to exchange a new management signal to generate the mesh path between the information processing device 210.

Therefore, in the first embodiment of the present technology, an example in which, when a mesh path is generated, a mesh path record destined for an information processing device which corresponds to NextHop is also generated (temporarily retained and updated) will be shown. In addition, in the first embodiment of the present technology, an example in which, when a record of NextHop is updated, a refreshing process of a path is set to be triggered as late as possible will be shown.

[Regarding Updating of a Valid Mesh Path]

Figure 19:
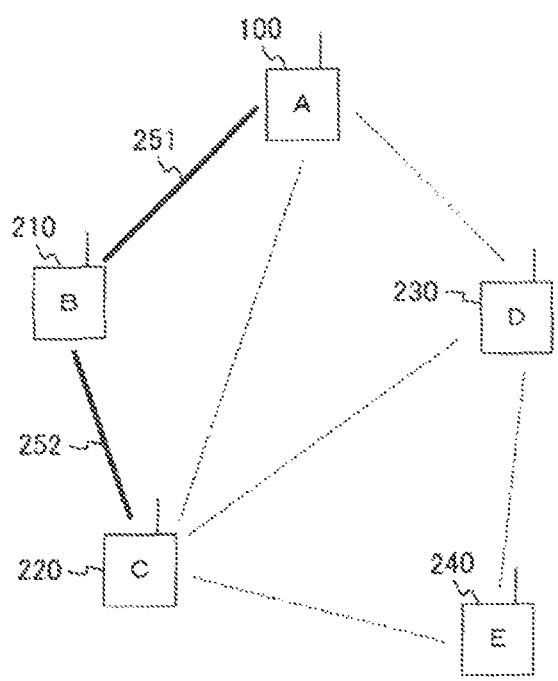
FIG. 19 is a diagram showing a case in which a valid mesh path is set in the communication system 200 according to the first embodiment of the present technology.

FIG. 19 is a diagram showing a case in which a valid mesh path is set in the communication system 200 according to the first embodiment of the present technology. In FIG. 19, an example in which the valid mesh path (indicated by the thick lines 251 and 252) of the path between the information processing device 100 and the information processing device 220 passing through the information processing device 210 (the path with the minimum metric value) is shown.

FIG. 20 is a diagram schematically showing the flow of data when the information processing device 100 according to the first embodiment of the present technology updates the valid mesh path.

Here, a case in which, when the expiration time of the mesh path shown in FIG. 19 is approaching, the mesh path is refreshed and updated is assumed. In this case, the information processing device 100 transmits a PREQ in which the information processing device 220 is set in the DestSTA field 323 in broadcast as shown in a of FIG. 20 to refresh the mesh path.

The information processing device 210 which has received the PREQ transmitted from the information processing device 100 transmits the PREQ in broadcast to transfer the received PREQ. In addition, the information processing device 220 which has received the PREQ transmitted by the information processing device 210 can select the comet path passing through the information processing device 210, and then perform the response process with a PREP.

However, a case in which the PREQ is not correctly transferred from the information processing device 100 to the information processing device 220 is also assumed. For example, a case in which the PREQ is not correctly transferred for a reason such as collision with another signal is assumed.

Here, in broadcast transmission, when transfer depending on Automatic Repeat Request (ARQ) is not performed, it is not possible to detect collision of signals. Thus, when broadcast transmission of the PREQ from the information processing device 210 to the information processing device 220 fails as shown in b of FIG. 20 (indicated by a x mark), the information processing device 220 is unable to receive the PREQ.

In this case, based on the reception result of the PREQ transmitted directly from the information processing device 100, the information processing device 220 generates a reply signal of a PREP and replies with the PREP directly to the information processing device 100. In this case, through a mesh path refreshing process, a wrong path may be set instead of a correct path.

In other words, rather than the path between the information processing device 100 and the information processing device 220 passing through the information processing device 210 (correct path), a path between the information processing device 100 and the information processing device 220 not passing through the information processing device 210 (wrong path) may be set.

Thus, in a second embodiment of the present technology, an example in which, when management information (a PREQ or an RANN) is transmitted to an information processing device which corresponds to NextHop of a valid mesh path, the same management information is transmitted in broadcast and unicast will be shown. This example will be shown in the second embodiment of the present technology.

[Configuration Example of a Mesh Path Table]

FIGS. 21 and 22 are diagrams schematically showing an example of a mesh path table (mesh path table 350) retained by each of the information processing devices which constitute the communication system 200 according to the first embodiment of the present technology.

In FIG. 21, a configuration of the mesh path table 350 is schematically shown, and in FIG. 22, an example of the content of the mesh path table 350 is shown. Specifically, in FIG. 22, Index 346, data name 347, and meaning 348 are shown as the example of the content of the mesh path table 350. It should be noted that the mesh path table 350 shown in FIGS. 21 and 22 is produced by adding new information to the mesh path table 340 shown in FIG. 8. Particularly, the information of the reference symbols f to k, n, p, and q is newly added information. Thus, the same reference symbols are given to the common parts in FIGS. 21 and 22 with the mesh path table 340 shown in FIG. 8, and a part of description thereof will be omitted. In addition, FIG. 21 corresponds to a of FIG. 8, and FIG. 22 corresponds to b of FIG. 8.

As shown in FIG. 21, the mesh path table 350 is recorded in the memory 150 in a record form. For the sake of facilitating description in the embodiment of the present technology, an example in which the mesh path table 350 produced by adding new information to the mesh path table 340 shown in FIG. 8 is managed as one table is shown. The newly added information (the information of the reference symbols f to k, n, p, and q), however, may be managed as a separate table (or in a separate memory) from the mesh path table 340.

In the ProactiveFlag 351 of "e" of the Index 346, a flag indicating whether or not a mesh path is one that has been proactively generated is stored.

In the ActReason 352 of "f" of the Index 346, a value indicating on which position in the mesh path a self-device is located is stored. As this value, a value indicating, for example, whether the self-device was OrigSTA, DestSTA, or a relay station of a certain number of hops from the OrigSTA when the mesh path was generated is stored.

In the Candidate (Cand.) Flag 353 of "g" of the Index 346, a flag indicating whether or not the information after "f" of the Index 346 is valid is stored.

In the Cand. NextHop 354 of "h" of the Index 346, the identifier of an information processing device determined to be a NextHop candidate toward the destination station of this record when a PREQ (or an RANN) has been received is stored. Here, the destination station of this record refers to an information processing device of which the identifier is stored in the OrigSTA of the received PREQ (or the RANN).

In the Cand. Metric 355 of "i" of the Index 346, a path metric value computed when the PREQ (or the RANN) is received is stored. This path metric value refers to a path metric value to the destination station of this record (i.e., OrigSTA of the PREQ (or the RANN)).

In the Cand. SeqNum 356 of "j" of the Index 346, a value of the SeqNum of the PREQ (or the RANN) used when this record is generated is stored.

In the Cand. ExpTime 357 of "k" of the Index 346, an expiration time decided based on Lifetime of the PREQ used when this record is generated is stored.

In the Cand. ActReason 358 of "n" of the Index 346, a value indicating a position on the mesh path at which the self-device is located is stored. As this value, for example, a value indicating whether the self-device was OrigSTA, DestSTA, or a relay node of a certain number of hops from the OrigSTA when the mesh path was generated is stored.

In the Cand. Neighbor (NB.) Metric 359 of "p" of the Index 346, a link metric value between a transmitting station of the PREQ (or the RANN) used when this record is used is stored.

In the Cand. NB. ExpTime 360 of "q" of the Index 346, an expiration time decided based on Lifetime of the PREQ used when this record is used is stored.

These items (the reference symbols f to k, n, p, and q) are recorded for a record of the destination station which corresponds to OrigSTA of the PREQ or the RANN at the time of reception of the PREQ and the RANN. In addition, they are referred to as original data at the timing at which the PREP is transmitted when the mesh path is to be updated.

[Operation Example of an Information Processing Device]

Next, operation examples of an information processing device will be described in detail with reference to drawings. It should be noted that, in each of the operation examples below, only the information processing device 100 will be described; however, the same can be applied to operations of the other information processing devices.

[Processing Example when a PREQ is Received]

FIG. 23 is diagram showing an example of updating of the mesh path table 350 retained by the information processing device 100 according to the first embodiment of the present technology. This updating will be described in detail with reference to FIG. 24.

Figure 24:
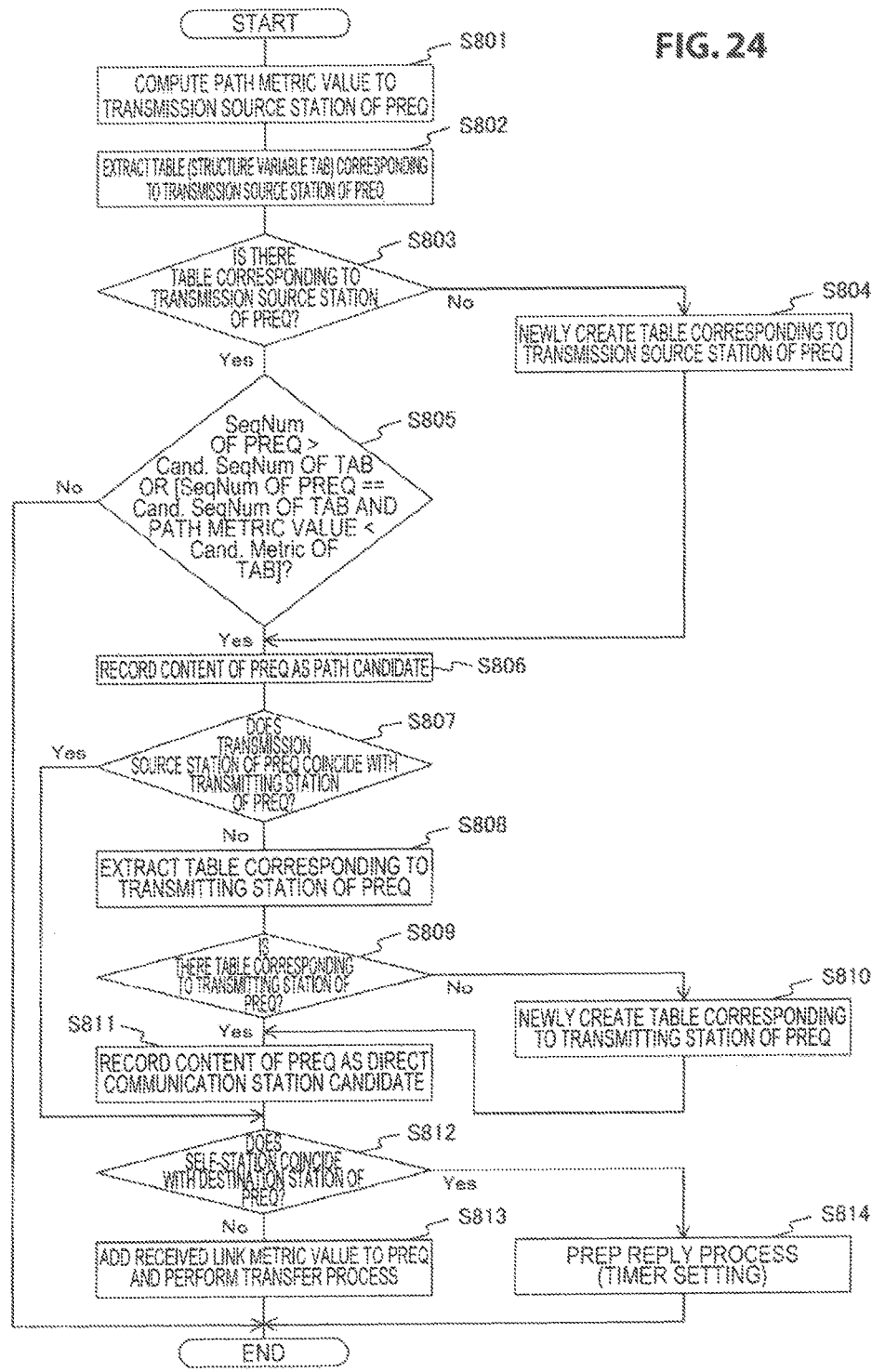
FIG. 24 is a flowchart showing an example of the process procedure of signal processing by the information processing device 100 according to the first embodiment of the present technology.

FIG. 24 is a flowchart showing an example of the process procedure of signal processing by the information processing device 100 according to the first embodiment of the present technology.

Here, the information processing device requesting generation of a mesh path transmits a PREQ according to the above-described procedure. Thus, in FIG. 24, an example of the process procedure of a signal transmission and reception process by the information processing device 100 which has received the PREQ is shown. It should be noted that the same reference symbols as those of the signal shown in FIG. 4 are given to those of the signal shown in this example. In addition, the same reference symbols as those of the mesh path table 350 shown in FIG. 21 are given to those of the mesh path table 350 shown in this example. In addition, the same applies to each reference symbol shown in each operation example below.

The control unit 140 of the information processing device 100 which has received the PREQ computes the path metric value to an information processing device (transmission source station) of which the identifier is stored in the OrigSTA field 322 of the received PREQ (Step S801). For example, the control unit 140 of the information processing device 100 acquires the link metric value between the transmitting station which has transmitted the received PREQ (the information processing device of which the identifier (address) is stored in the TX STA ADDR field 303) and the self-station. For example, the control unit 140 of the information processing device 100 can estimate the link metric value between the transmitting station and the self-station based on a Received Signal Strength Indicator (RSSI) of the current beacon. For example, a correspondence table of the RSSI and the metric value is held beforehand, and using this table, the metric value can be estimated from the RSSI. Next, the control unit 140 of the information processing device 100 adds the link metric value obtained from that addition to the value stored in the Metric field 326 of the received PREQ and thereby computes the path metric value (Step S801).

Then, the control unit 140 of the information processing device 100 extracts a record of which destination (Dest 341) is set to the transmission source station of which the identifier is stored in the OrigSTA field 322 of the received PREQ from the mesh path table 350 (Step S802). This record will also be referred to as a structure variable TAB.

Next, the control unit 140 of the information processing device 100 determines whether or not there is a record of which the destination is set to the transmission source station of which the identifier is stored in the OrigSTA field 322 (Step S803). When there is no such record (Step S803), the control unit 140 of the information processing device 100 generates a new record of which the destination (Dest 341) is set to the transmission source station in the mesh path table 350 (Step S804).

In addition, when there is a record of which the destination is set to the transmission source station of which the identifier is stored in the OrigSTA field 322 (Step S803), the control unit 140 of the information processing device 100 determines whether or not a path candidate is to be set (Step S805). In other words, the control unit 140 of the information processing device 100 determines whether or not the value of the SeqNum field 324 of the received PREQ is greater than the value of the Cand. SeqNum 356 of the TAB (shown in FIG. 21). In addition, the control unit 140 of the information processing device 100 determines whether or not the values coincide and the computed path metric value (the path metric value from the transmission source station to the self-device) is smaller than the value of the Cand. Metric 355 of the TAB (shown in FIG. 21).

When these conditions for being a path candidate are satisfied (Step S805), the control unit 140 of the information processing device 100 determines that the transmitting station of the PREQ received this time is the path candidate to the destination station of the extracted record (Step S805). In this case, the control unit 140 of the information processing device 100 stores the information in each of the record items thereof as shown in a of FIG. 23 (Step S806). This corresponds to a process in which path candidate information is temporarily retained (Step S806).

Specifically, the ProactiveFlag 351 of "e" of the Index 346 stores TrueValue or FalseValue based on the flags field 321 or the DestSTA field 323 of the received PREQ. In other words, when the flags field 321 indicates a proactive mesh path generation process, or broadcast is designated in the DestSTA field 323, TrueValue is stored. On the other hand, FalseValue is stored in other cases.

In addition, in the Cand. Flag 353 of "g" of the Index 346, the indication that the information is valid is set. That is, TrueValue is stored.

In addition, in the Cand. NextHop 354 of "h" of the Index 346, the identifier of the TX STA ADDR field 303 of the received PREQ is stored.

In addition, in the Cand. Metric 355 of "i" of the Index 346, the computed path metric value (the path metric value from the transmission source station to the self-device) is stored.

In addition, in the Cand. SeqNum 356 of "j" of the Index 346, the value stored in the SeqNum field 324 of the received PREQ is stored.

In addition, in the Cand. ExpTime 357 of "k" of the Index 346, the value obtained by adding the current time to the value stored in the Lifetime field 327 of the received PREQ (the expiration time of the mesh path) is stored.

In addition, in the Cand. ActReason 358 of "n" of the Index 346, 2 is stored when the self-device is recorded in the DestSTA field 323 of the PREQ. In this case, the refreshing process is set to be triggered the second earliest. On the other hand, when the self-device is not recorded in the DestSTA field 323 of the PREQ, the value of the HopCount field 325 of the PREQ×2+4 is stored.

On the other hand, when it is determined not to be the path candidate (Step S805), the control unit 140 of the information processing device 100 discards the PREQ and finishes the operation of the PREQ reception process.

Then, the control unit 140 of the information processing device 100 determines whether or not the transmission source station of the received PREQ coincides with the transmitting station (Step S807). In other words, the control unit 140 of the information processing device 100 determines whether or not the identifier stored in the OrigSTA field 322 of the PREQ coincides with the identifier stored in the TX STA ADDR field 303 of the PREQ (Step S807). Here, when the transmission source station of the received PREQ does not coincide with the transmitting station, it means that the received PREQ has been transmitted from another information processing device (transmission source station).

In addition, when the transmission source station of the received PREQ does not coincide with the transmitting station (Step S807), the control unit 140 of the information processing device 100 extracts a record of which the destination is set to the transmitting station from the mesh path table 350 (Step S808). In other words, the control unit 140 of the information processing device 100 extracts the record of which the destination is set to the transmitting station of which the identifier is stored in the TX STA ADDR field 303 from the mesh path table 350 (Step S808).

Then, the control unit 140 of the information processing device 100 determines whether or not there is a record of which the destination is set to the transmitting station of which the identifier is stored in the TX STA ADDR field 303 (Step S809). When there is no such record (Step S809), the control unit 140 generates a new record of which the destination (Dest 341) is set to the transmitting station in the mesh path table 350 (Step S810).

In addition, the case in which there is a record of which the destination is set to the transmitting station of which the identifier is stored in the TX STA ADDR field 303 is assumed (Step S809). In this case, the control unit 140 of the information processing device 100 stores the content of the received PREQ as a direct communication station candidate (nearby communication station candidate) (Step S811). In other words, the control unit 140 of the information processing device 100 stores the information in each of the record items thereof as shown in b of FIG. 23 (Step S811). This corresponds to a process in which the path candidate information is temporarily retained (Step S811).

Specifically, in the Cand. Flag 353 of "g" of the Index 346, the fact that the information is valid is stored. In other words, TrueValue is stored.

In addition, in the Cand. NB. Metric 359 of "p" of the Index 346, the link metric value between the transmitting station of the received PREQ and the self-station is stored.

In addition, in the Cand. NB. ExpTime 360 of "q" of the Index 346, the value obtained by adding the current time to the value stored in the Lifetime field 327 of the received PREQ (the expiration time of the mesh path) is stored.

Then, the control unit 140 of the information processing device 100 determines whether the destination station of the received PREQ coincides with the self-station (Step S812). In other words, the control unit 140 of the information processing device 100 determines whether the identifier stored in the DestSTA field 323 of the received PREQ coincides with the identifier of the self-device (Step S812).

Then, when the destination station of the received PREQ does not coincide with the self-station (Step S812), the control unit 140 of the information processing device 100 performs a transfer process of the received PREQ (Step S813). In this case, the control unit 140 of the information processing device 100 updates the Metric field 326 of the received PREQ with the path metric value, and updates the HopCount field 325 with an incremented value, and then the PREQ with the updated fields is transferred (Step S813).

When the destination station of the received PREQ coincides with the self-station (Step S812), the control unit 140 of the information processing device 100 starts the response process with a PREP, without performing the transfer process of the received PREQ (Step S814). Here, the control unit 140 of the information processing device 100 does not immediately perform the reply with the PREP, but sets a timer for holding a grace period before the PREP is transmitted (Step S814). It should be noted that, when a timer for the reply process destined for the transmission source station corresponding to the OrigSTA field 322 of the received PREQ is already set, the process ends with no further operation.

[Setting Example of a Timer]

Next, the timer set in the reply process with the PREQ will be described.

As described above, when generating a path, an information processing device waits until a destination station replies with a PREP after the device transmits a PREQ. When there is no reply after a predetermined period of time elapses from the transmission of the PREQ, the information processing device re-transmits the PREQ. Thus, if a value of the timer (a grace period until the transmission of a PREP) is significantly exceeded, there is concern of wasteful re-transmission of the PREQ being induced due to a delay in transmission of a PREP.

A time taken until re-transmission of a PREQ is decided based on, for example, a parameter value used in the system. The IEEE 802.11s standard stipulates, for example, the time taken until re-transmission of a PREQ as equal to or longer than 2×(dot11MeshHWMPnetDiameteTraversalTime) at the minimum. Here, (dot11MeshHWMPnetDiameterTraversalTime) is an estimated value necessary for the process from transmission of a path request signal by an information processing device to spread of the signal over a network through relay of the signal. For this reason, it is necessary to set a value of the timer (a grace period until the transmission of a PREP) to a value smaller than the estimated value.

In addition, the IEEE 802.11s standard stipulates, for example, an estimated value which indicates the number of hops in relay necessary for a path request signal to spread over the network after the information processing device transmit the signal. Specifically, as the estimated value, a parameter (dot11MeshHWMPnetDiameter) is decided. Using these parameters, an estimated value A of a transfer time per hop can be computed with the following expression.

$$A = (\text{dot11MeshHWMPnetDiameterTraversalTime}) \div (\text{dot11MeshHWMPnetDiameter})$$

In addition, the value of the timer (a grace period until the transmission of a PREP) is preferably set to be greater than the estimated value A.

Taking the above points into consideration, the value of the timer (a grace period until the transmission of a PREP) B is preferably set to satisfy the following condition.

$$B < (\text{dot11MeshHWMPnetDiameterTraversalTime}) \times C$$

$$B > A \times D$$

Here, C is a constant, and for example, a value from about 4 to 16 can be set. In addition, D is a constant, and a value from about 1 to 8 can be set.

As described above, the value of the timer (a grace period until the transmission of a PREP) is useless if it is too short, but if it is too long, destabilized behavior of the system is induced, and thus it is important to set a proper value.

As described above, the control unit 140 can decide the value of the timer (predetermined time) based on the two estimated values (dot11MeshHWMPnetDiameterTraversalTime and dot11MeshHWMPnetDiameter)

[Reception Process and Transmission Process of a PREP]

When the timer for transmission of the PREP described above is over or when a PREP destined for an information processing device other than the self-station has been received, the information processing device 100 starts a transmission process of a PREP. Thus, the process at the time of transmission of the PREP will be described using FIGS. 25 to 28.

FIGS. 25 and 26 are diagrams showing an example of updating the mesh path table 350 retained by the information processing device 100 according to the first embodiment of the present technology. This updating will be described in detail with reference to FIG. 27.

Figure 27:
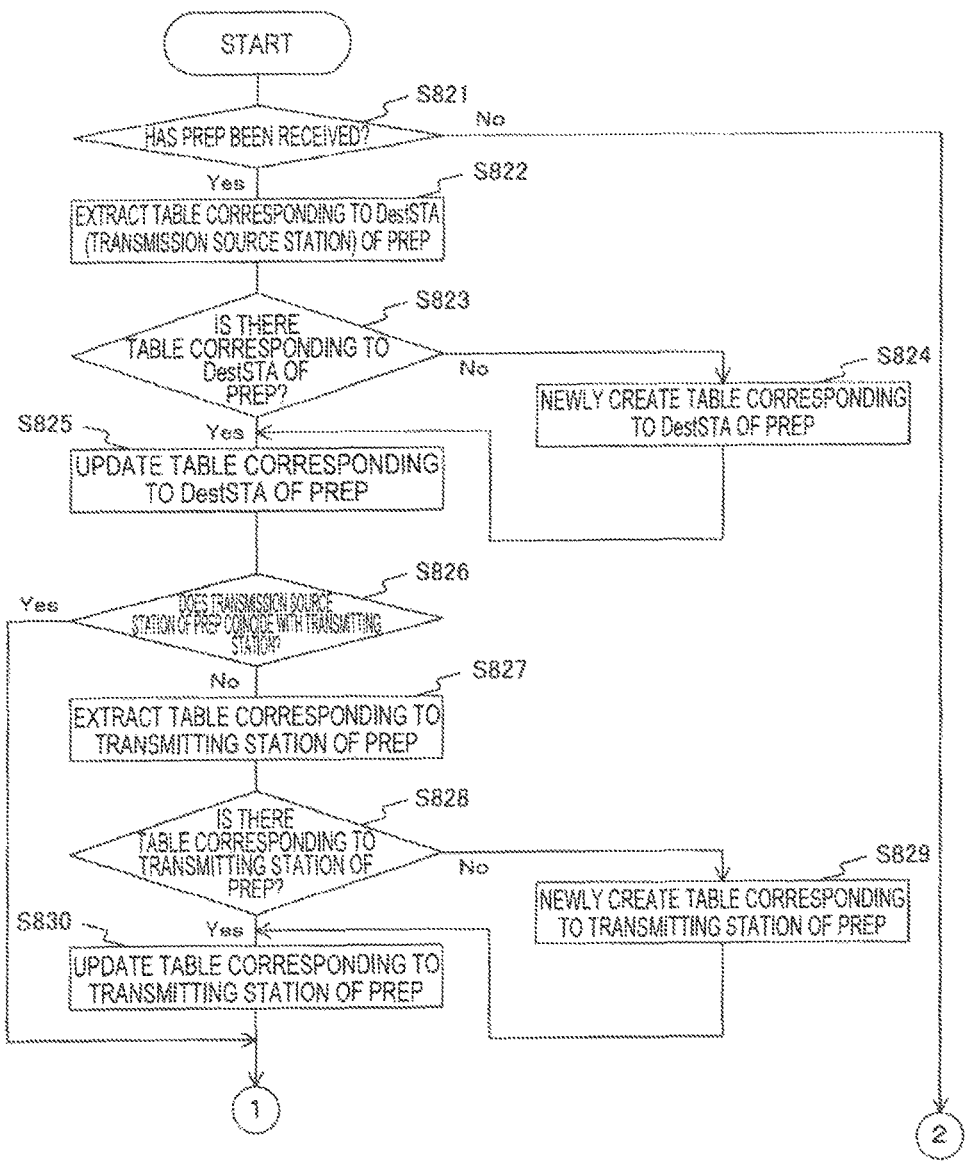
FIG. 27 is a flowchart showing an example of the process procedure of signal processing by the information processing device 100 according to the first embodiment of the present technology.
Figure 28:
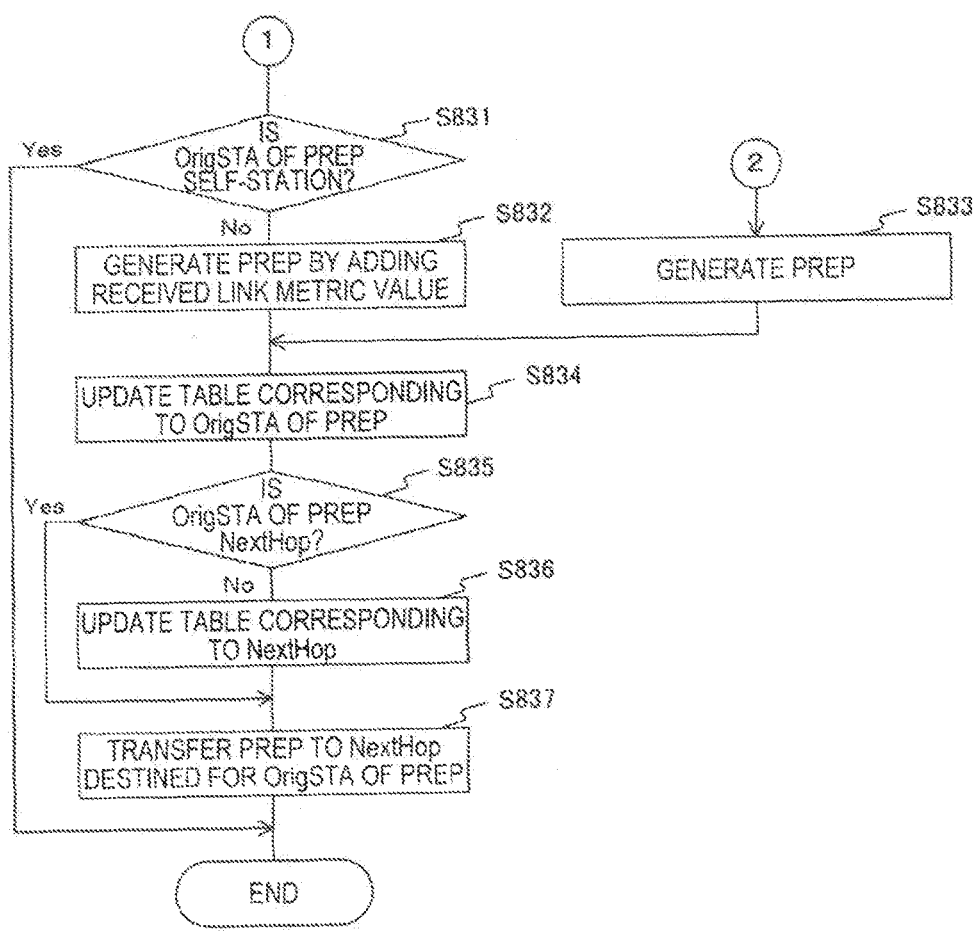
FIG. 28 is a flowchart showing an example of the process procedure of signal processing by the information processing device 100 according to the first embodiment of the present technology.

FIGS. 27 and 28 are flowcharts showing an example of the procedure of signal processing performed by the information processing device 100 according to the first embodiment of the present technology.

First, the control unit 140 of the information processing device 100 determines whether the process of this time is to be started as a reply process to a PREQ destined for the self-station or to be started according to reception of a PREP (Step S821). When the process is to be started as a reply process to the PREQ destined for the self-station (Step S821), the control unit 140 of the information processing device 100 transcribes information from the PREQ or the like, and generates a PREP to be transmitted (Step S833). By generating the PREP to be transmitted in this manner, a transmission process is prepared (Step S833).

When the process is to be started according to reception of a PREP (Step S821), the control unit 140 of the information processing device 100 extracts a record corresponding to the transmission source station of the received PREP from the mesh path table 350 (Step S822). In other words, the control unit 140 of the information processing device 100 extracts a record of which the destination (Dest 341) is set to the transmission source station of which the identifier is stored in the DestSTA field 333 of the received PREP from the mesh path table 350 (Step S822).

Next, the control unit 140 of the information processing device 100 determines whether or not there is a record of which the destination is set to the transmission source station of which the identifier is stored in the DestSTA field 333 (Step S823). When there is no such record (Step S823), the control unit 140 of the information processing device 100 generates a new record of which the destination (Dest 341) is set to the transmission source station in the mesh path table 350 (Step S824).

In addition, when there is the record of which the destination is set to the transmission source station of which the identifier is stored in the DestSTA field 333 (Step S823), the control unit 140 of the information processing device 100 updates the record as shown in a of FIG. 25 (Step S825). This is a process corresponding to setting a mesh path.

Specifically, in the NextHop 342 of "a" of the Index 346, the TX STA ADDR field 303 of the PREP is stored. In addition, in the Metric 343 of "b" of the Index 346, the path metric value computed by adding the link metric value between the transmitting station and the self-station to the Metric field of the PREP is stored. In addition, in the SeqNum 344 of "c" of the Index 346, the value of SeqNum of the PREP is stored. In addition, in the ExpTime 345 of "d" of the Index 346, the value obtained by adding the current time to Lifetime of the PREP is stored. In addition, in the ActReason 352 of "f" of the index 346, 1 is stored when the self-station is the OrigSTA field 332 of the PREP, and the value of the HopCount field 335 of the PREP×2+3 is stored in other cases. By storing 1 in the ActReason 352 of "f" of the Index 346, the refreshing process can be set to be triggered as early as possible. In addition, FalseValue is stored in the Cand. Flag 353 of "g" of the Index 346, and the same value as that stored in the SeqNum 344 of "c" of the Index 346 is stored in the Cand. SeqNum of "j" of the Index 346.

Then, the control unit 140 of the information processing device 100 determines whether or not the transmission source station of the received PREP coincides with the transmitting station of the received PREP (Step S826). In other words, the control unit 140 of the information processing device 100 determines whether or not the identifier of the DestSTA field 333 of the received PREP coincides with the identifier of the TX STA ADDR field 303 of the received PREP (Step S826).

When the transmission source station of the received PREP does not coincide with the transmitting station of the received PREP (Step S826), the control unit 140 of the information processing device 100 extracts a record of which the destination station is set to the transmitting station from the mesh path table 350 (Step S827). In other words, the control unit 140 of the information processing device 100 extracts a record of which the destination (Dest 341) is set to the transmitting station of which the identifier is stored in the TX STA ADDR field 303 of the received PREP from the mesh path table 350 (Step S827).

Next, the control unit 140 of the information processing device 100 determines whether or not there is a record of which the destination is set to the transmitting station of which the identifier is stored in the TX STA ADDR field 303 (Step S828). When there is no such record (Step S828), the control unit 140 of the information processing device 100 generates a new record of which the destination (Dest 341) is set to the transmitting station in the mesh path table 350 (Step S829).

In addition, when there is the record of which the destination is set to the transmitting station of which the identifier is stored in the TX STA ADDR field 303 (Step S828), the control unit 140 of the information processing device 100 updates the record as shown in b of FIG. 25 (Step S830). This corresponds to a process of cutting overhead in generation of a path because a mesh path record destined for NextHop is also generated on that occasion.

Specifically, in the NextHop 342 of "a" of the Index 346, the TX STA ADDR field 303 of the PREP is stored. In addition, in the Metric 343 of "b" of the Index 346, the link metric value between the self-station and the transmitting station is stored. In addition, in the SeqNum 344 of "c" of the Index 346, an invalid value (for example, a value determined to be "smaller" than any value) is stored. In addition, in the ExpTime 345 of "d" of the Index 346, the value obtained by adding the current time to the value of the Lifetime field 337 of the PREP is stored. In addition, 0 is stored in the ActReason 352 of "f" of the Index 346. As 0 is stored in the ActReason 352 of "f" of the Index 346 as described, the refreshing process can be set to be triggered as late as possible. In addition, FalseValue is stored in the Cand. Flag 353 of "g" of the Index 346, and further the same value as that stored in the SeqNum 344 of "c" of the Index 346 is stored in the Cand. SeqNum of "j" of the Index 346.

Then, the control unit 140 of the information processing device 100 determines whether or not the identifier stored in the OrigSTA field 322 of the received PREP is of the self-station (Step S831). When the identifier stored in the OrigSTA field 322 of the received PREP is of the self-station (Step S831), the operation of the reception process of the PREP ends.

When the identifier stored in the OrigSTA field 322 of the received PREP is not of the self-station (Step S831), the control unit 140 of the information processing device 100 generates a PREP (Step S832). In other words, the control unit 140 of the information processing device 100 updates the value of the Metric field 336 of the received PREP by adding the link metric value between the self-station and the transmitting station thereto, updates the HopCount with an incremented value, and thereby generates a PREP (Step S832). In this manner, by generating the PREP to be transferred, the transmission process is prepared (Step S832).

Then, the control unit 140 of the information processing device 100 updates the record which corresponds to the OrigSTA field 332 of the prepared PREP for transmission (Step S834). In other words, the control unit 140 of the information processing device 100 extracts the record which corresponds to the OrigSTA field 332 of the prepared PREP for transmission from the mesh path table 350. Then, the control unit 140 of the information processing device 100 checks that the Cand. Flag 353 of the extracted record ("g" of the Index 346) has turned into TrueValue. Then, the control unit 140 of the information processing device 100 updates this record as shown in a of FIG. 26 (Step S834). This corresponds to a process in which information primarily retained when the PREQ was received (path candidate information) is reflected as shown in FIG. 24.

Specifically, in the NextHop 342 of "a" of the Index 346, the value of the Cand. NextHop 354 of the record is transcribed. In addition, in the Metric 343 of "b" of the Index 346, the value of the Cand. Metric 355 of the record is transcribed. In addition, in the SeqNum 344 of "c" of the Index 346, the value of the Cand. SeqNum 356 of the record is transcribed. In addition, in the ExpTime 345 of "d" of the Index 346, the value of the Cand. ExpTime 357 of the record is transcribed. In addition, in the ActReason 352 of "f" of the Index 346, the value of the Cand. ActReason 358 of the record is transcribed. In addition, in the Cand. Flag 353 of "g" of the Index 346, the indication that the information is invalid is set (in other words, FalseValue is stored).

In addition, depending on cases, the ProactiveFlag 351 of the record is referred to, and the record is transcribed into the ProactiveFlag 351 of the record extracted in Step S822. It should be noted that this process is necessary only when the proactive PREQ is used.

Then, the control unit 140 of the information processing device 100 determines whether or not the OrigSTA field 332 of the received PREP (the destination station of the PREP) coincides with the NextHop of the record updated in Step S834 (Step S835). When they do not coincide (Step S835), the control unit 140 of the information processing device 100 updates a record of which the destination station is set to the NextHop (Step S836). In other words, the control unit 140 of the information processing device 100 extracts the record of which the destination station is set to the NextHop from the mesh path table 350. Then, the control unit 140 of the information processing device 100 checks whether the Cand. Flag 353 of the extracted record has turned into TrueValue. Then, the control unit 140 of the information processing device 100 updates the record as shown in b of FIG. 26 (Step S836). This corresponds to a process in which information (nearby path candidate information) primarily retained when the PREQ has been received is reflected as shown in FIG. 24, and to a process of cutting overhead in generation of a path as a mesh path record destined for the NextHop is generated.

Specifically, in the NextHop 342 of "a" of the Index 346, the NextHop of the record using the OrigSTA of the PREP as a key is stored. In addition, the value of the Cand. NB. Metric 359 of the record is transcribed into the Metric 343 of "b" of the Index 346. In addition, in the SeqNum 344 of "c" of the Index 346, an invalid value (for example, a value determined to be "smaller" than any value) is stored. In addition, the value of the Cand. NB. ExpTime of the record is transcribed into the ExpTime 345 of "d" of the Index 346.

In addition, 0 is stored in the ActReason 352 of "f" of the Index 346. In other words, as 0 is stored in the ActReason 352 of "f" of the Index 346 as described, (the refreshing process can be set to be triggered as late as possible. In addition, FalseValue is stored in the Cand. Flag 353 of "g" of the Index 346, and further, the same value as that stored in the SeqNum 344 of "c" of the Index 346 is stored in the Cand. SeqNum of "j" of the Index 346.

Then, the control unit 140 of the information processing device 100 transmits the PREP generated in Step S832 or S833 to the NextHop destined for the OrigSTA of the PREP in unicast (Step S837). In the RX STA ADDR field 302 of the PREP, the identifier (address) of the NextHop is stored.

[Adjustment Example of a Transmission Trigger of a PREQ]

FIG. 29 is a diagram showing a threshold value used when the information processing device 100 according to the first embodiment of the present technology adjusts a transmission trigger of a PREQ.

As described above, in order to investigate an information processing device to be set as a receiving station when data is to be transmitted to another information processing device, the information processing device 100 refers to the mesh path table 350. In other words, the information processing device 100 refers to the mesh path table 350 in order to investigate an information processing device to be designated as NextHop when data is to be transmitted to another information processing device.

However, cases in which, as a result of referring to the mesh path table 350, there is no record corresponding to the information processing device serving as a destination station, the record is not storing valid information, or the expiration time of the record has passed are assumed. In those cases, the information processing device 100 generates and transmits a PREQ for setting a valid mesh path to the destination station. In addition, when an RANN has been received, the information processing device 100 generates and transmits a PREQ for proactive generation of a mesh path.

Furthermore, even when a valid mesh path is stored in the record extracted from the mesh path table 350, if the expiration time of the mesh path is approaching, it is important to prevent a delay of data transfer caused by invalidation of the valid mesh path. Thus, when the expiration time is determined to be approaching even when a valid mesh path is stored in an extracted record, the information processing device 100 transmits a PREQ for the purpose of refreshing the mesh path.

For example, when a value until the expiration time of a mesh path is equal to or smaller than a threshold value X (msec), the information processing device 100 triggering transmission of a PREQ for the purpose of refreshing can be considered. However, if a plurality of information processing devices on a mesh path simultaneously transmit PREQs for the purpose of refreshing, overhead of management information increases, and therefore it is important to cut the overhead.

Thus, in the embodiment of the present technology, the threshold value X of the time until expiration is adjusted according to a value set in the ActReason 352 of "f" of the Index 346 of a record of a mesh path. Specifically, the adjustment is performed as shown in FIG. 29.

In other words, when the value set in the ActReason 352 is 0, the control unit 140 of the information processing device 100 does not adjust the threshold value. In other words, X'=X is set.

In addition, when the value set in the ActReason 352 is 1, the control unit 140 of the information processing device 100 computes X'=X+800 (msec) and uses it as the threshold value of the time until expiration.

In addition, when the value set in the ActReason 352 is 2, the control unit 140 of the information processing device 100 computes X'=X+400 (msec) and uses it as the threshold value of the time until expiration.

In addition, when the value set in the ActReason 352 is equal to or greater than 3, the control unit 140 of the information processing device 100 computes X'=min(X+(20×the value of the ActReason 352), 300) and uses it as the threshold value of the time until expiration. Here, min(A, B) is a function outputting the smaller one between input values A and B.

Through this adjustment, the OrigSTA field 322 of the PREQ is set to trigger transmission of the PREQ the earliest for the purpose of refreshing, and the DestSTA field 323 of the PREQ is set to trigger transmission of the PREQ next for the purpose of refreshing. In addition, a relay station is set to be triggered at different timings. Accordingly, the plurality of information processing devices on the mesh path can be controlled not to simultaneously transmit the PREQ for the purpose of refreshing.

Furthermore, for a mesh path destined for the NextHop that is a subset of the mesh path, transmission of a PREQ for the purpose of refreshing is set to be triggered as late as possible, which can cut overhead of management information necessary for maintaining the mesh paths.

In this manner, based on the position of the information processing device 100 on a mesh path (communication path), the control unit 140 changes an effective time for specifying a time at which path information thereof is destroyed.

[Process Example when an RANN is Received]

FIG. 30 is a diagram showing an example of updating of the mesh path table 350 retained by the information processing device 100 according to the first embodiment of the present technology. The updating will be described in detail with reference to FIG. 31.

Figure 31:
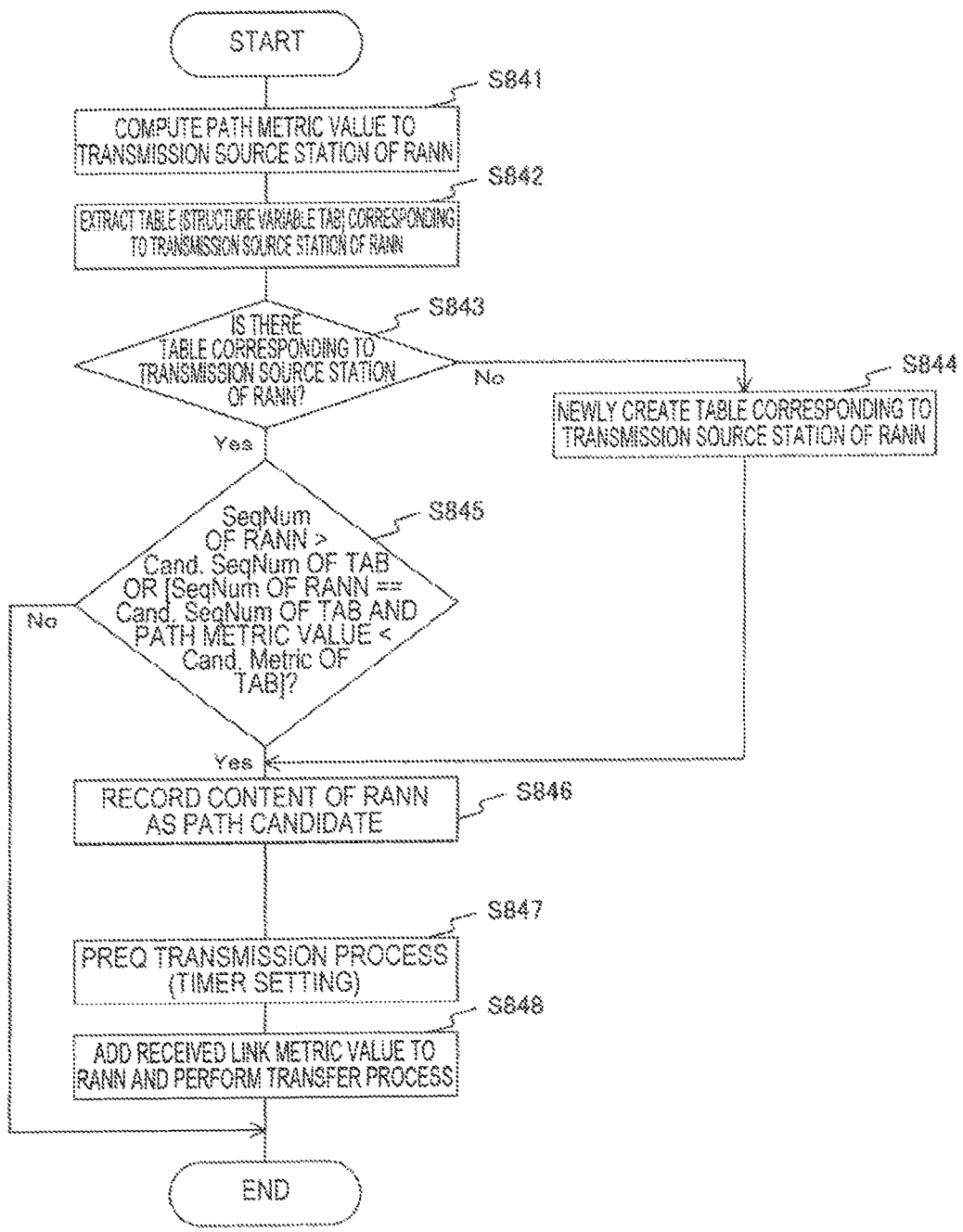
FIG. 31 is a flowchart showing an example of the process procedure of signal processing by the information processing device 100 according to the first embodiment of the present technology.

FIG. 31 is a flowchart showing an example of the process procedure of signal processing by the information processing device 100 according to the first embodiment of the present technology.

As described above, in order to generate a proactive mesh path with a root station, when an information processing device receives an RANN, the device transmits a PREQ to the transmission source station of the RANN in response thereto. Thus, in FIG. 31, an example of the procedure of signal processing by the information processing device 100 which has received the RANN will be shown.

The control unit 140 of the information processing device 100 which has received the RANN computes the path metric value to the information processing device (transmission source station) of which the identifier is stored in the OrigSTA field 314 of the received RANN (Step S841). For example, the control unit 140 of the information processing device 100 computes the link metric value between the self-station and the information processing device that transmitted the received RANN (the information processing device of which the identifier (address) is stored in the TX STA ADDR field 303). Then, the control unit 140 of the information processing device 100 computes the path metric value by adding the computed link metric value to the value stored in the Metric field 317 of the received RANN (Step S841).

Then, the control unit 140 of the information processing device 100 extracts a record of which destination (Dest 341) is set to the transmission source station of which the identifier is stored in the OrigSTA field 314 of the received RANN from the mesh path table 350 (Step S842). This record will also be referred to as a structure variable TAB.

Next, the control unit 140 of the information processing device 100 determines whether or not there is a record of which the destination is set to the transmission source station of which the identifier is stored in the OrigSTA field 314 (Step S843). When there is no such record (Step S843), the control unit 140 of the information processing device 100 generates a new record of which the destination (Dest 341) is set to the transmission source station in the mesh path table 350 (Step S844).

In addition, when there is a record of which the destination is set to the transmission source station of which the identifier is stored in the OrigSTA field 314 (Step S843), the control unit 140 of the information processing device 100 determines whether or not a path candidate is to be set (Step S845). In other words, the control unit 140 of the information processing device 100 determines whether or not the value of the SeqNum 315 of the received RANN is greater than the value of the Cand. SeqNum 356 of the TAB (shown in FIG. 21). In addition, the control unit 140 of the information processing device 100 determines whether or not the values coincide and the computed path metric value (the path metric value from the transmission source station to the self-device) is smaller than the value of the Cand. Metric 355 of the TAB (shown in FIG. 21).

When these conditions for being a path candidate are satisfied (Step S845), the control unit 140 of the information processing device 100 determines that the transmitting station of the RANN received this time is the path candidate to the destination station of the extracted record (Step S845). In this case, the control unit 140 of the information processing device 100 stores the information in each of the record items thereof as shown in FIG. 30 (Step S846). This corresponds to a process in which path candidate information is temporarily retained (Step S846).

Specifically, in the ProactiveFlag 351 of "e" of the Index 346, TrueValue is stored (optional). In addition, in the Cand. Flag 353 of "g" of the Index 346, the indication that the information is valid is set. In other words, TrueValue is stored in the Cand. Flag 353 of "g" of the Index 346.

In addition, in the Cand. NextHop 354 of "h" of the Index 346, the identifier (address) of the TX STA ADDR field 303 of the RANN is stored. Furthermore, in the Cand. Metric 355 of "i" of the Index 346, the computed path metric value (the path metric value from the transmission source station to the self-station) is stored. In addition, in the Cand. SeqNum 356 of "j" of the Index 346, the value of the SeqNum field 315 of the received RANN is stored.

On the other hand, when the station is determined not to be a path candidate (Step S845), the control unit 140 of the information processing device 100 discards the RANN and finishes the operation of the reception process of the RANN.

In addition, when the station is determined to be a path candidate (Step S845) and the information is stored (Step S846), the control unit 140 of the information processing device 100 starts a generation process of a PREQ (Step S847). Here, the control unit 140 of the information processing device 100 does not immediately perform the reply with the PREQ, but sets a timer for holding a grace period before the PREQ is transmitted (Step S847). It should be noted that, when a timer for a generation process of a PREQ destined for the transmission source station corresponding to the OrigSTA field 314 of the received RANN has already been set, the process ends without setting a timer. Then, the control unit stands by until the timer is over.

Then, the control unit 140 of the information processing device 100 performs a transfer process of the received RANN (Step S848). In this case, the control unit 140 of the information processing device 100 updates the Metric field 317 of the received RANN with the path metric value, and updates the HopCount field 316 with an incremented value, and transfers the RANN with the updated values (Step S848).

It should be noted that, although not illustrated in FIG. 31, when the timer for the generation process of the PREQ is over, the transmission process of the PREQ is started.
[Timer Setting Example]

Next, the timer set according to the reply process to the RANN will be described.

Here, as described above, the value of the timer (a grace period until the transmission of the PREQ) is useless if it is too short, but if it is too long, a destabilized behavior of the system is induced, and thus it is important to set a proper value. In addition, as described above, the estimated value A of a transfer time per hop can be computed with the following expression.

$$A = (dot11MeshHWMPnetDiameterTraversalTime) + (dot11MeshHWMPnetDiameter)$$

Thus, the grace period until the transmission of the PREP is preferably set to be greater than the estimated value A.

In addition, the value of the timer (the grace period until the transmission of the PREQ) B is preferably set to satisfy the following condition.

$$B > A \times D$$

Here, D is a constant and can be set to a value from about 1 to 8.

As above, the control unit 140 controls a timing at which path information regarding a mesh path (communication path) set through exchanging of a signal is confirmed to be delayed with reference to a reception timing of the signal. Specifically, after receiving a path request signal (a PREQ or an RANN), the control unit 140 retains path information regarding a communication path to the transmission source station of the path request signal in the mesh path table 350 as path candidate information. Then, the control unit 140 confirms the path candidate information as the path information regarding the communication path to the transmission source station at the timing at which a path reply signal (a PREP or a PREQ) corresponding to the path request signal is transmitted to the transmission source station.

In addition, after receiving a path request signal of which the destination is not the information processing device 100, the control unit 140 retains path information regarding a communication path to the transmitting station which has transmitted the path request signal in the mesh path table 350 as nearby path candidate information. Then, the control unit 140 confirms the nearby path candidate information as the path information regarding the communication path to the transmitting station at the timing at which a path reply signal corresponding to the path request signal is transmitted to the transmission source signal.

In addition, after receiving a path request signal of which the destination is the information processing device 100, the control unit 140 transmits a path reply signal corresponding to the path request signal to the transmission source station of the path request signal at the timing at which a predetermined period of time (timer) elapses from reception of the path request signal. It should be noted that, although an example in which the Cand. SeqNum 356 ("j" of the Index 346) is provided as an item of the mesh path table 350 has been shown in the embodiment of the present technology, the Cand. SeqNum 356 may be omitted. When the Cand. SeqNum 356 is omitted like that, for example, the storage process and the reading process with respect to the Cand. SeqNum 356 described above can be interpreted as a storage process and a reading process with respect to the SeqNum 344.

2. Second Embodiment

The case in which, when an active mesh path is generated, a PREQ is transmitted in broadcast has been shown in the first embodiment of the present technology. When the PREQ is transmitted in broadcast, however, there is a possibility of the PREQ dissipating due to collision of signals or the like. When the PREQ dissipates in that way, for example, an improper mesh path may be set as shown in FIG. 20.

Therefore, in a second embodiment of the present technology, an example in which, when an information processing device transmits management information (a PREQ or an RANN) to a destination station between which a value mesh path is being retained, the information processing device performs unicast transmission along with broadcast transmission to a NextHop will be shown. It should be noted that a communication system of the second embodiment of the present technology is substantially the same as the communication system 200 shown in FIG. 1 and the like. Thus, the same reference symbols are given to the common parts with the communication system 200, and part of description thereof will be omitted.
[Example of Updating of a Valid Mesh Path]

FIGS. 32 and 33 are diagrams showing examples of transmission of a PREQ by each of the information processing devices which constitute the communication system 200 according to the second embodiment of the present technology.

In FIGS. 32 and 33, a case in which there is a valid mesh path between the information processing device 100 and the information processing device 220 passing through the information processing device 210 is assumed. An example in which the information processing device 100 transmits a PREQ destined for the information processing device 220 for the purpose of refreshing the mesh path in that case is shown.

In a of FIG. 32, an example in which the information processing device 100 transmits a PREQ destined for the information processing device 220 in unicast is shown. In b of FIG. 32, an example in which the information processing device 100 transmits PREQs destined for the information processing device 220 in broadcast is shown.

In a of FIG. 33, an example in which a PREQ from the information processing device 100 destined for the information processing device 220 is transmitted in unicast is shown. In b of FIG. 33, an example in which PREQs from the information processing device 100 destined for the information processing device 220 are transmitted in broadcast is shown.

As shown in a of FIG. 32, the information processing device 100 transmits the PREQ to the information processing device 210 in unicast for the purpose of refreshing the mesh path. In other words, the information processing device 100 transmits the PREQ in which the information processing device 220 is designated in the DestSTA field 323 to the information processing device 210 designated in the NextHop 342 destined for the information processing device 220 in unicast.

In addition, as shown in b of FIG. 32, the information processing device 100 transmits in broadcast the PREQs having the same content as the PREQ transmitted in unicast.

As shown in a and b of FIG. 32, when the PREQs having the same content are transmitted in unicast and broadcast, the information processing device 210 overlappingly receives two PREQs having the same content. When two PREQs having the same content are overlappingly received in this way, one of the PREQs is destroyed in the above-described reception procedure. Thus, overlapping transmission of two PREQs having the same content is not a problem.

Here, when a signal transmitted in unicast collides with another signal, a re-transmission process is performed using ARQ. Thus, even when a PREQ transmitted in unicast collides with another signal, a re-transmission process of a PREQ is performed, and thus a PREQ can be delivered to the information processing device 210 with high reliability.

Upon receiving the PREQ, the information processing device 210 processes the received PREQ in the above-described procedure, updates the records of the internal mesh path table 350, and starts a transfer process of the received PREQ.

Here, as shown in a of FIG. 33, upon recognizing that there is a valid mesh path destined for the DestSTA of the PREQ, the information processing device 210 also transmits the PREQ destined for the NextHop in unicast. In addition, the information processing device 210 transmits in broadcast a PREQ having the same content as the PREQ transmitted in unicast as shown in b of FIG. 33.

By receiving the PREQ transmitted from the information processing device 210, the information processing device 220 starts a reply process with a PREP. Accordingly, a finally stabilized mesh path between the information processing device 100 and the information processing device 220 can be maintained.

An operation example of updating a valid mesh path will be described in detail with reference to FIG. 34.

[Operation Example of Updating of a Valid Mesh Path]

FIG. 34 is a flowchart showing the procedure of signal processing by the information processing device 100 according to the second embodiment of the present technology.

When a transmission process of a PREQ is started, the control unit 140 of the information processing device 100 extracts the mesh path table 350 corresponding to the destination station of the PREQ and determines whether or not there is a valid mesh path to the destination station (Step S851). When there is a valid mesh path to the destination station (Step S851), the control unit 140 of the information processing device 100 transmits the PREQ in unicast to the NextHop 342 of the valid mesh path (Step S852).

Then, the control unit 140 of the information processing device 100 transmits in broadcast the same PREQ as the PREQ transmitted in unicast (Step 8853).

It should be noted that, although the example in which the PREQ is transmitted in unicast and then the PREQ is transmitted in broadcast has been shown in FIG. 34, the PREQ may be transmitted in broadcast and then the PREQ may be transmitted in unicast.

[Operation Example of RANN Transmission]

As described above, vulnerability of a PREQ to collision with a signal transmitted in broadcast when a valid mesh path is updated can be said to be shared by an RANN used when a mesh path is proactively generated. In other words, there is a possibility of an RANN dissipating due to collision or the like since it also is transmitted in broadcast, and thus there is a possibility of a mesh path which is unstable due to such dissipation being generated.

Thus, in the second embodiment of the present technology, an information processing device which transmits an RANN is also designed to perform unicast transmission to an information processing device corresponding to the NextHop of a valid mesh path. An operation example of the information processing device in this case is shown in FIG. 35.

FIG. 35 is a flowchart showing the procedure of signal processing by the information processing device 100 according to the second embodiment of the present technology.

When a transmission process of an RANN is started, the control unit 140 of the information processing device 100 scans each record of the mesh path table 350 and repeatedly performs a process of extracting a proactively generated mesh path (Loop L860). Here, whether or not it is a proactively generated mesh path can be determined by referring to the ProactiveFlag 351 of the record.

Then, when there is a record of a proactively generated mesh path, the control unit 140 of the information processing device 100 extracts the NextHop 342 of the record (Step S861). Then, the control unit 140 of the information processing device 100 determines whether or not the RANN to be transmitted this time has already been transmitted to the NextHop 342 in unicast (Step S862).

Then, when the signal has not been transmitted in unicast (Step S862), the control unit 140 of the information processing device 100 transmits the RANN to the NextHop 342 in unicast (Step S863). However, when the RANN signal is triggered by receiving an RANN from another information processing device, the RANN is not transmitted to the transmitting station of the received RANN.

Then, the control unit 140 of the information processing device 100 records in the NextHop 342 the fact that the RANN has been transmitted in unicast (Step S864). For example, the control unit 140 of the information processing device 100 records the identifier of the NextHop 342 to which the RANN has been transmitted in unicast and the fact that the RANN has been transmitted in unicast in the memory 150 (Step S864).

When this recording process has ended (Step S864), or the signal is determined to have been transmitted in unicast (Step S862), the process of extracting a proactively generated mesh path is repeatedly performed (Loop L860).

In addition, when the scanning ends (Loop L860), the control unit 140 of the information processing device 100 transmits the RANN in broadcast (Step S865). Accordingly, the RANN signal can be transmitted as stably as necessary.

Although the example in which the RANN is transmitted in unicast and then the RANN is transmitted in broadcast has been shown in FIG. 35, the RANN may be transmitted in broadcast and then the RANN may be transmitted in unicast.

Here, a case in which the information processing device 100 transmits an RANN to all information processing devices near the information processing device 100 (nearby stations) in unicast can also be assumed. In such a case, the information processing device 100 can skip broadcast transmission.

[Transmission Example of a Proactive PREQ]

As a technique for proactively generating a mesh path, a method in which a root station regularly transmits a proactive PREQ is also considered, in addition to the method using an RANN.

The proactive PREQ is a PREQ signal which is transmitted with a broadcast address described in the DestSTA field 323 and each information processing device which receives the signal is designated as a destination station. Similar to an RANN, the proactive PREQ is also regularly transmitted from a root station. Since this proactive PREQ is also transmitted in broadcast, there is a possibility of the signal dissipating due to collision or the like, and there is a possibility of a mesh path which is unstable due to such dissipation being generated.

Thus, in the second embodiment of the present technology, an information processing device which transmits a proactive PREQ performs unicast transmission to an information processing device corresponding to the NextHop of a valid mesh path. An operation example of an information processing device in that case is shown in FIG. 36.

FIG. 36 is a flowchart showing the procedure of signal processing by the information processing device 100 according to the second embodiment of the present technology.

When a transmission process of a proactive PREQ is started, the control unit 140 of the information processing device 100 scans each record of the mesh path table 350 and repeatedly performs a process of extracting a proactively generated mesh path (Loop L870). Here, whether or not it is a proactively generated mesh path can be determined by referring to the ProactiveFlag 351 of the record.

Then, when there is a record of a proactively generated mesh path, the control unit 140 of the information processing device 100 extracts the NextHop 342 of the record (Step S871). Then, the control unit 140 of the information processing device 100 determines whether or not the proactive PREQ to be transmitted this time has already been transmitted to the NextHop 342 in unicast (Step S872).

Then, when the signal is not transmitted in unicast (Step S872), the control unit 140 of the information processing device 100 transmits the proactive PREQ to the NextHop 342 in unicast (Step S873). However, when the transmission of the PREQ is triggered by receiving a PREQ from another information processing device, the PREQ is not transmitted in unicast to the transmitting station of the received PREQ.

Then, the control unit 140 of the information processing device 100 records in the NextHop 342 the fact that the proactive PREQ has been transmitted in unicast (Step S874). For example, the control unit 140 of the information processing device 100 records the identifier of the NextHop 342 to which the proactive PREQ has been transmitted in unicast and the fact that the proactive PREQ has been transmitted in unicast in the memory 150 (Step S874).

When this recording process has ended (Step S874), or the signal is determined to have been transmitted in unicast (Step S872), the process of extracting a proactively generated mesh path is repeatedly performed (Loop L870).

In addition, when the scanning ends (Loop L870), the control unit 140 of the information processing device 100 transmits the proactive PREQ in broadcast (Step S875). Accordingly, the proactive PREQ signal can be transmitted as stably as necessary.

Although the example in which the proactive PREQ is transmitted in unicast and then the proactive PREQ is transmitted in broadcast has been shown in FIG. 36, the proactive PREQ may be transmitted in broadcast and then the proactive PREQ may be transmitted in unicast.

Here, a case in which the information processing device 100 transmits a proactive PREQ to all information processing devices near the information processing device 100 (nearby stations) in unicast can also be assumed. In such a case, the information processing device 100 can skip broadcast transmission.

As described above, when a signal is transmitted to another information processing device and there is path information regarding a communication path to the other information processing device, the control unit 140 transmits the signal to the other information processing device in unicast, and performs control to transmit the signal in broadcast. In addition, when there is no path information regarding the communication path to the information processing device, the control unit 140 transmits the signal in broadcast.

In addition, when a signal for updating a proactively generated communication path is transmitted, the control unit 140 transmits the signal in unicast to an information processing device that is the next destination specified by path information regarding the communication path and transmits the signal in broadcast.

As described above, according to the embodiment of the present technology, a stable multi-hop path can be provided in the mesh path generation process. In addition, in the mesh path updating process, a stable multi-hop path can be provided while unnecessary overhead is cut. That is, stability of a mesh path can be enhanced. In other words, generation and management of a communication path between a plurality of information processing devices can be properly performed.

3. Application Example

The technology of the present disclosure can be applied to various products. For example, the information processing device 100 may be realized as a mobile terminal such as a smartphone, a tablet-type personal computer (PC), a notebook PC, a portable game terminal, or a digital camera, a fixed-type terminal such as a television receiver set, a printer, a digital scanner, or a network storage, or an in-vehicle terminal such as a car navigation device. In addition, the information processing device 100 may be realized as a terminal which performs machine-to-machine (M2M) communication (which is also referred to as a machine-type communication (MTC) terminal) such as a smart meter, a vending machine, a remote monitoring device, or a point-of-sale (POS) terminal. Furthermore, the information processing device 100 may be a wireless communication module (for example, an integrated circuit module configured in one die) mounted in these terminals.

3-1. First Application Example

FIG. 37 is a block diagram showing an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gym sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another device via a wireless LAN access point in an infrastructure mode. In addition, the wireless communication interface 913 can directly communicate with another device in an ad hoc mode. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals.

It should be noted that the smartphone 900 is not limited to the example of FIG. 37 and may include a plurality of antennas (for example, an antenna for a wireless LAN, an antenna for the proximity wireless communication scheme, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 37 via feeder lines, which are partially shown as dashed lines in the figure. The auxiliary controller 919 operates a minimum necessary function of the smartphone 900, for example, in a sleep mode.

In the smartphone 900 shown in FIG. 37, the communication unit 120, the control unit 140, and the memory 150 described using FIG. 2 may be implemented by the wireless communication interface 913. In addition, at least some of these functions may be implemented by the processor 901 or the auxiliary controller 919.

3-2. Second Application Example

Figure 38:
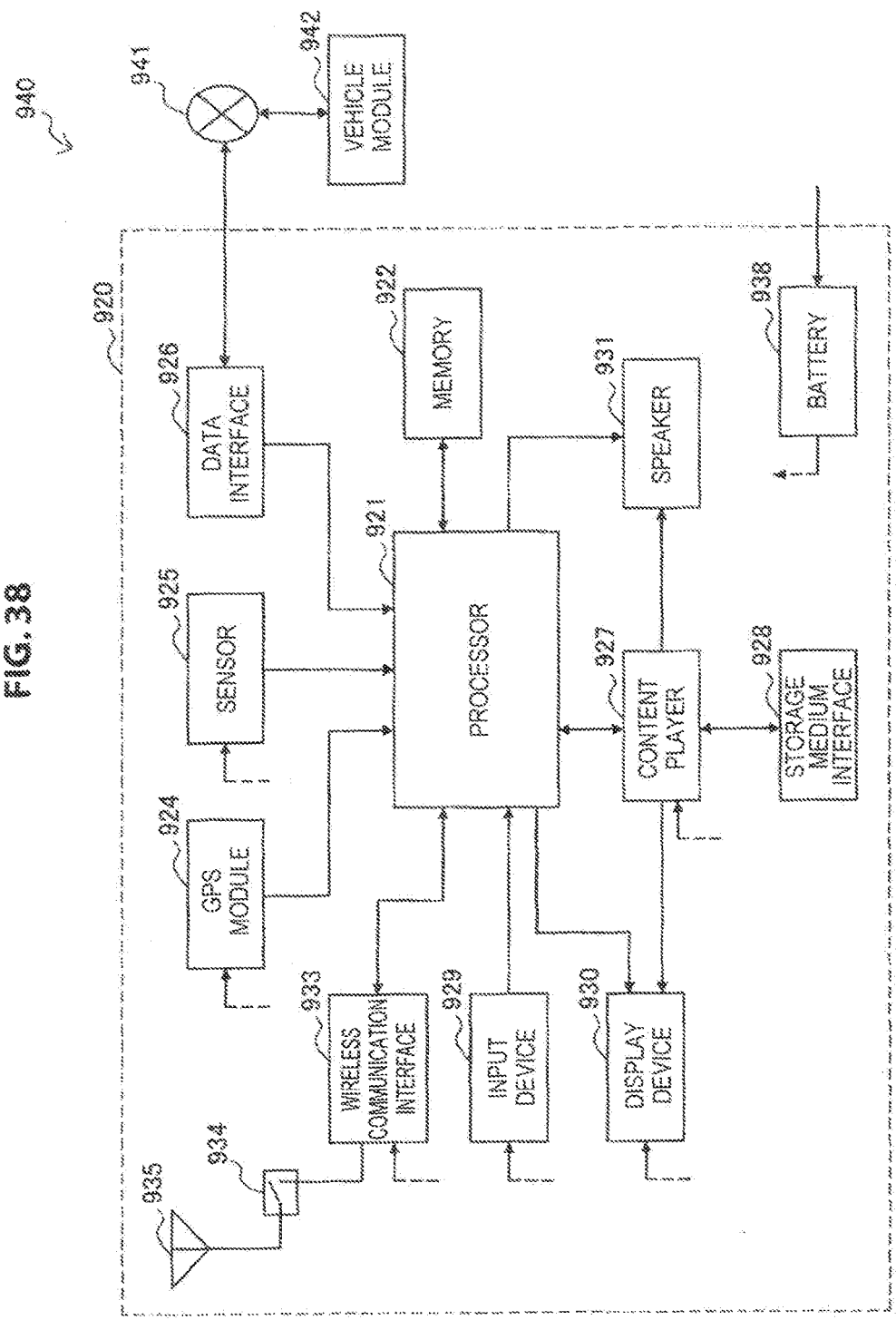
FIG. 38 is a block diagram showing an example of a schematic configuration of a car navigation device.

FIG. 38 is a block diagram illustrating an example of a schematic configuration of a car navigation device 920 to which the technology of the present disclosure may be applied. The car navigation device 920 includes a processor 921, a memory 922, a global positioning system (OPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation device 920. The memory 922 includes RAM and ROM, and stores a program that is executed by the processor 921, and data.

The OPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 802.11a, 11b, 11g, 11n, 11ac, and 11ad to execute wireless communication. The wireless communication interface 933 can communicate with another device via a wireless LAN access point in an infrastructure mode. In addition, the wireless communication interface 933 can directly communicate with another device in an ad hoc mode. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation device 920 may include a plurality of antennas, not limited to the example of FIG. 38. In that case, the antenna switches 934 may be omitted from the configuration of the car navigation device 920.

The battery 938 supplies power to blocks of the car navigation device 920 illustrated in FIG. 38 via feeder lines that are partially shown as dashed lines in the figure. The battery 938 accumulates power supplied form the vehicle.

In the car navigation device 920 illustrated in FIG. 38, the communication unit 120, the control unit 140, and the memory 150 described by using FIG. 2 may be implemented by the wireless communication interface 933. At least a part of the functions may also be implemented by the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disc), a memory card, and a Blu-ray disc (registered trademark) can be used.

Effects described in the present description are just examples, the effects are not limited, and there may be other effects.

Additionally, the present technology may also be configured as below.

(1)

An information processing device including:

a communication unit configured to perform exchange of a signal for generation or updating of a multi-hop communication path using wireless communication with another information processing device; and a control unit configured to perform control in a manner that, when there is path information regarding a communication path to another information processing device in a case in which the signal is transmitted to the other information processing device, the signal is transmitted to the other information processing device in unicast, and the signal is transmitted in broadcast.

(2)

The information processing device according to (1), wherein the control unit transmits the signal in broadcast when there is no path information regarding the communication path to the other information processing device.

(3)

The information processing device according to (1), wherein, when a communication path which has been proactively generated is set and a signal for updating the communication path is transmitted, the control unit transmits the signal in unicast to an information processing device serving as a next destination specified with path information regarding the communication path and transmits the signal in broadcast.

(4)

The information processing device according to any of (1) to (3), wherein, when a path request signal of which a destination is the information processing device has been received as the signal, the control unit causes a path reply signal corresponding to the path request signal to be transmitted in the unicast and the broadcast to a transmission source station which is an information processing device which has transmitted the path request signal first at a timing at which a predetermined period of time elapses from reception of the path request signal.

(5)

An information processing method including:

a communication procedure of performing exchange of a signal for generation or updating of a multi-hop communication path using wireless communication with another information processing device; and a control procedure of performing control in a manner that, when there is path information regarding a communication path to another information processing device in a case in which the signal is transmitted to the other information processing device, the signal is transmitted to the other information processing device in unicast, and the signal is transmitted in broadcast.

REFERENCE SIGNS LIST

100, 210, 220, 230, 240 information processing device
110 antenna
120 communication unit
130 I/O interface
140 control unit
150 memory
160 bus
171 movement detection unit
172 operation reception unit
173 display unit
174 audio output unit
200 communication system
900 smartphone
901 processor
902 memory
903 storage
904 external connection interface
906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content player
928 storage medium interface
929 input device
930 display device
931 speaker 933 wireless communication interface
934 antenna switch
935 antenna
938 battery
941 in-vehicle network
942 vehicle module

The invention claimed is:

1. A first information processing device, comprising:
one or more processors configured to:
generate or update a multi-hop communication path based on an exchange of a signal in a wireless communication with a second information processing device;
control transmission of the signal to the second information processing device in unicast transmission along with broadcast transmission based on path information associated with a communication path to the second information processing device obtained from the signal transmitted to the second information processing device, wherein the signal, that is transmitted in the broadcast transmission along with the unicast transmission to the second information processing device, is based on a valid mesh path that is set; and
transmit a path reply signal corresponding to a path request signal in the unicast transmission along with the broadcast transmission to the second information processing device based on a reception of the path request signal as the signal, from the second information processing device, that has been received after a first particular time period has elapsed from the reception of the path request signal, wherein the transmission of the path reply signal starts after elapse of the first particular time period.

2. The first information processing device according to claim 1,
wherein the one or more processors are further configured to transmit the signal in the broadcast transmission based on a lack of the path information associated with the communication path to the second information processing device.

3. The first information processing device according to claim 1,
wherein, the one or more processors are further configured to transmit the signal in the unicast transmission to the second information processing device that serves as a next destination specified with the path information associated with the communication path and transmit the signal to the second information processing device in the broadcast transmission based on a proactively generated communication path that is set and transmission of the signal to update the communication path.

4. The first information processing device according to claim 1,
wherein the signal is transmitted to the second information processing device in the broadcast transmission after the transmission of the signal in the unicast transmission and,
wherein the signal that is transmitted to the second information processing device comprises same content during the unicast transmission and the broadcast transmission.

5. The first information processing device according to claim 1,
wherein the signal is transmitted to the second information processing device in the unicast transmission after the transmission of the signal in the broadcast transmission and,
wherein the signal that is transmitted to the second information processing device comprises same content during the unicast transmission and the broadcast transmission.

6. The first information processing device according to claim 1,
wherein a mesh path record is retained in each of the first information processing device and the second information processing device based on exchange of data between the first information processing device and the second information processing device that occurs before a second particular time period elapses.

7. The first information processing device according to claim 1, wherein the one or more processors are further configured to:
transmit a root announcement signal in the unicast transmission to the second information processing device on a proactively generated communication path.

8. An information processing method, comprising:
generating or updating, by one or more processors of a first information processing device, a multi-hop communication path based on an exchange of a signal in a wireless communication with a second information processing device;
controlling, by the one or more processors, transmission of the signal to the second information processing device in unicast transmission along with broadcast transmission based on path information associated with a communication path to second information processing device obtained from the signal transmitted to the second information processing device, wherein the signal, that is transmitted in the broadcast transmission along with the unicast transmission to the second information processing device, is based on a valid mesh path that is set; and
transmitting a path reply signal corresponding to a path request signal in the unicast transmission along with the broadcast transmission to the second information processing device based on a reception of the path request signal as the signal, from the second information processing device, that has been received after a particular time period has elapsed from the reception of the path request signal, wherein the transmission of the path reply signal starts after elapse of the particular time period.

9. The first information processing device according to claim 6,
wherein the one or more processors are further configured to control delay of the path information associated with the mesh path record with reference to a reception timing of the signal.

10. The first information processing device according to claim 6, wherein the second particular time period is set based on at least one of a lifetime of the path request signal or a lifetime of the path reply signal.

* * * * *